(12) United States Patent
Labine et al.

(10) Patent No.: US 9,117,375 B2
(45) Date of Patent: Aug. 25, 2015

(54) EQUATION-BASED ASSESSMENT GRADING METHOD AND PARTICIPANT RESPONSE SYSTEM EMPLOYING SAME

(75) Inventors: David Labine, Calgary (CA); Lothar Wenzel, Round Rock, TX (US); Albert Chu, Calgary (CA)

(73) Assignee: SMART Technologies ULC, Calgary (CA)

(*) Notice: Subject to any disclaimer, the term of this patent is extended or adjusted under 35 U.S.C. 154(b) by 353 days.

(21) Appl. No.: 13/169,550

(22) Filed: Jun. 27, 2011

(65) Prior Publication Data

US 2011/0318724 A1    Dec. 29, 2011

Related U.S. Application Data

(60) Provisional application No. 61/358,788, filed on Jun. 25, 2010.

(51) Int. Cl.
| | | |
|---|---|---|
| *G09B 19/00* | (2006.01) | |
| *G09B 7/00* | (2006.01) | |
| *G09B 19/02* | (2006.01) | |
| *G09B 5/00* | (2006.01) | |
| *G09B 7/08* | (2006.01) | |
| *G09B 7/02* | (2006.01) | |

(52) U.S. Cl.
CPC . *G09B 7/08* (2013.01); *G09B 19/02* (2013.01)

(58) Field of Classification Search
CPC .............. G09B 7/00; G09B 7/02; G09B 5/00; G09B 19/00; G09B 19/02; G09B 7/08
USPC .................. 434/188, 201, 322, 323, 350
See application file for complete search history.

(56) References Cited

U.S. PATENT DOCUMENTS

| | | | |
|---|---|---|---|
| 4,247,908 A | | 1/1981 | Lockhart, Jr. et al. |
| 5,002,491 A | | 3/1991 | Abrahamson et al. |
| 5,259,766 A | | 11/1993 | Sack et al. |
| 5,317,647 A | * | 5/1994 | Pagallo .................. 382/161 |
| 5,410,701 A | | 4/1995 | Gopalraman |

(Continued)

FOREIGN PATENT DOCUMENTS

| | | |
|---|---|---|
| JP | 06-231165 A | 8/1994 |
| WO | 2007/092194 A2 | 8/2007 |
| WO | 2008/083485 A1 | 7/2008 |

OTHER PUBLICATIONS

Mohammed Shatnawi et al., "Equivalence detection using parse-tree normalization for math search", Digital Information Management, 2007 (ICDIM '07), Oct. 28-31, 2007, vol. 2, pp. 643-648.

(Continued)

*Primary Examiner* — Sam Yao
*Assistant Examiner* — Jerry-Daryl Fletcher
(74) *Attorney, Agent, or Firm* — Katten Muchin Rosenman LLP

(57) ABSTRACT

A computerized assessment grading method comprises creating a syntax tree for a received equation-based response to at least one assessment question and a syntax tree for at least one solution to the at least one question, comparing the syntax trees, and grading the response based on the results of the comparison.

34 Claims, 21 Drawing Sheets

(56) References Cited

U.S. PATENT DOCUMENTS

| | | | |
|---|---|---|---|
| 6,381,444 | B1 | 4/2002 | Aggarwal |
| 6,790,045 | B1 | 9/2004 | Drimmer |
| 7,523,434 | B1 | 4/2009 | Taylor et al. |
| 2004/0072136 | A1 | 4/2004 | Roschelle et al. |
| 2005/0058976 | A1* | 3/2005 | Vernon .......................... 434/322 |
| 2010/0010801 | A1* | 1/2010 | Meijer et al. ....................... 704/9 |
| 2011/0244434 | A1* | 10/2011 | Livne et al. ................... 434/188 |

OTHER PUBLICATIONS

Transmittal; International Search Report; and Written Opinion of the International Searching Authority for U.S. Patent Application No. PCT/CA2011/000752, with a mailing date of Oct. 12, 2011.

Extended European Search Report for European Patent Application No. 11 797 428.7, with a mailing date of Mar. 13, 2015.

* cited by examiner

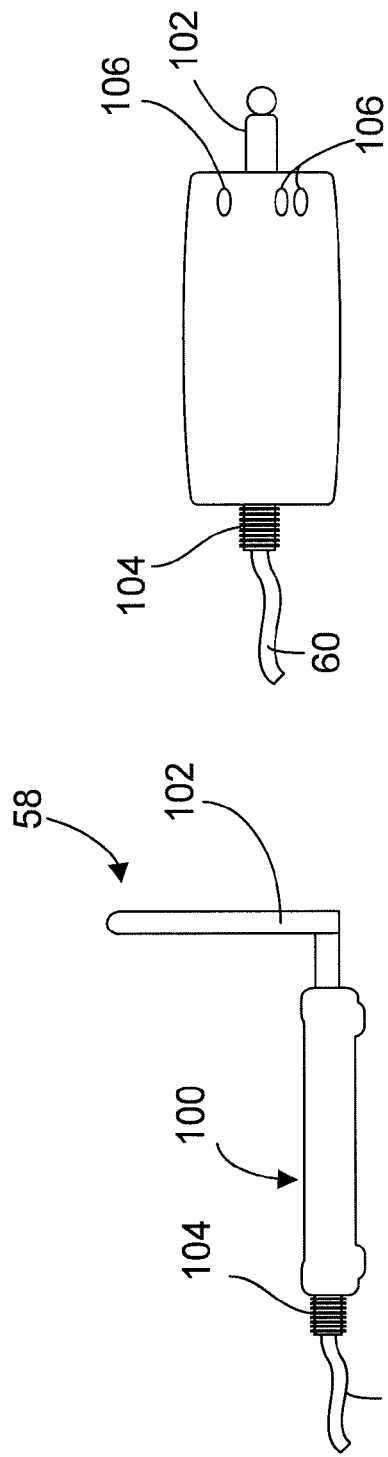
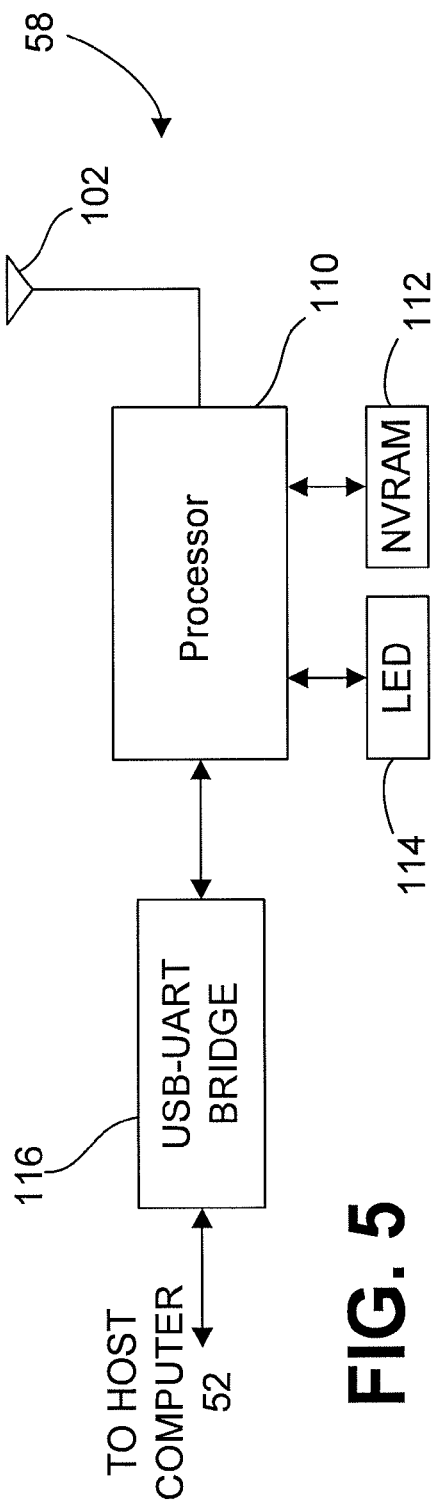

Solve: (x-1)(x+3) — 802
Answer: $x^2+2x-3$ — 804

Order Equivalence

Some Acceptable Solutions: — 806
$x^2+2x-3$
$X^2+2(x)-3$
$X^2+2*x-3$
$X^2+2*(x)-3$
$(x)^2+2x-3$

Formal Equivalence

Some Acceptable Solutions: — 808
$x^2+2x-3$
$-3+2x+x^2$
$2x-3+x^2$
$x^2+2*x-3$
$x^2+2*(x)-3$
$x^2+2(x)-3$

Content Equivalence

Some Acceptable Solutions: — 810
$x^2+x+x-3$
$X^2+3x-x-3$
$xx+2x-3$
$x*x+2*(x)-3$
$3x^2-2x^2+2*x-5+2$
$x^2+2x-3$
$(x-1)(x+3)$
$(x+3)(x-1)$
$-3+2x+x^2$
$2x-3+x^2$
$x^2+2*x-3$
$x^2+2*(x)-3$
$x^2+2(x)-3$

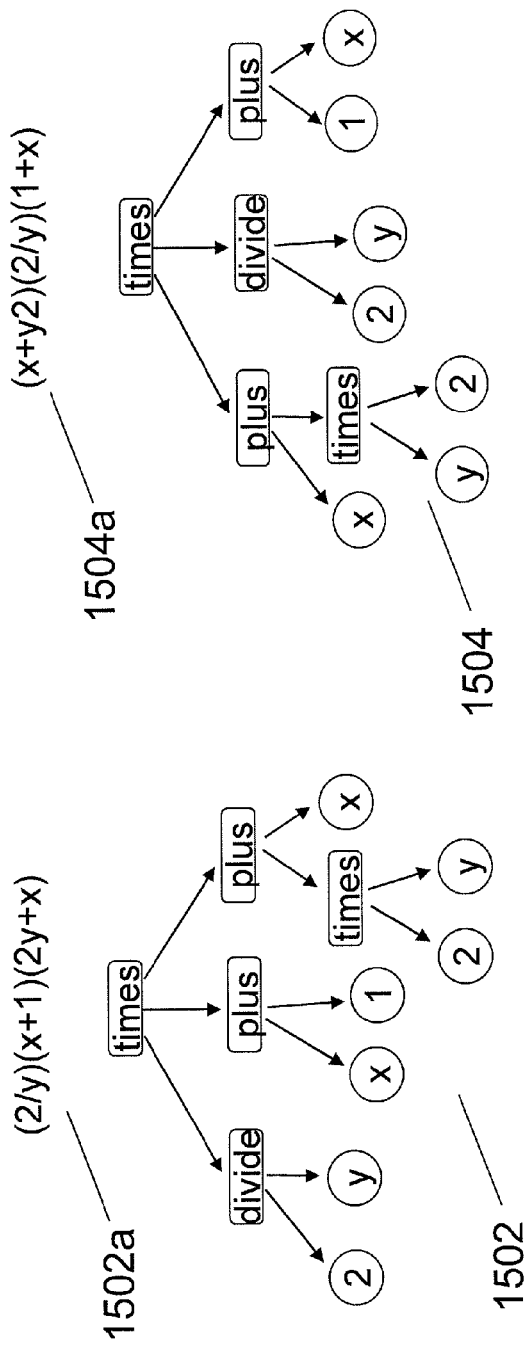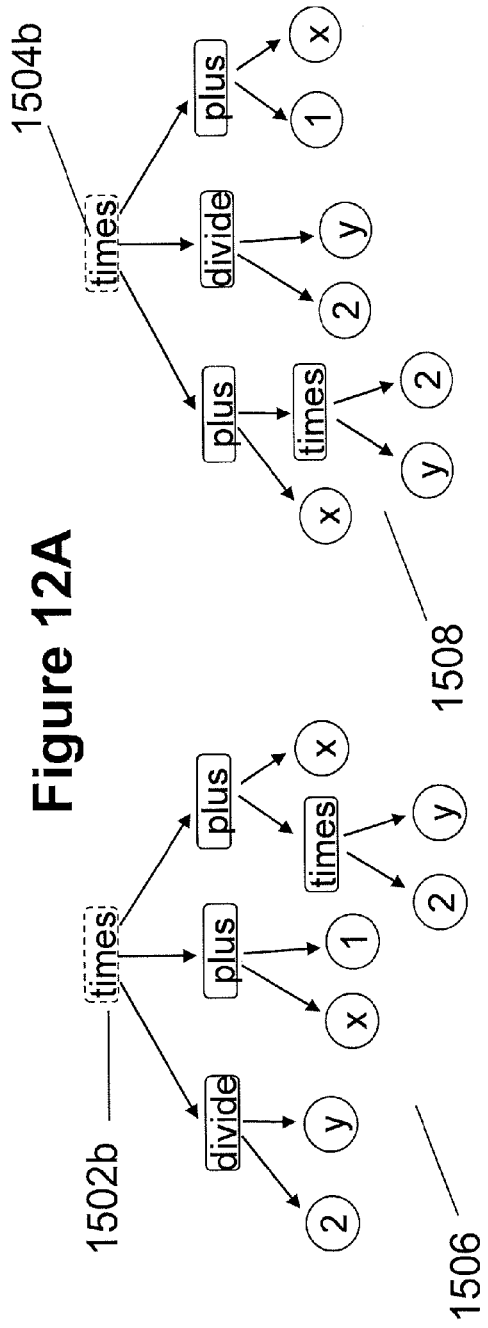
Figure 12A
Figure 12B

1510

1512

1514

1516

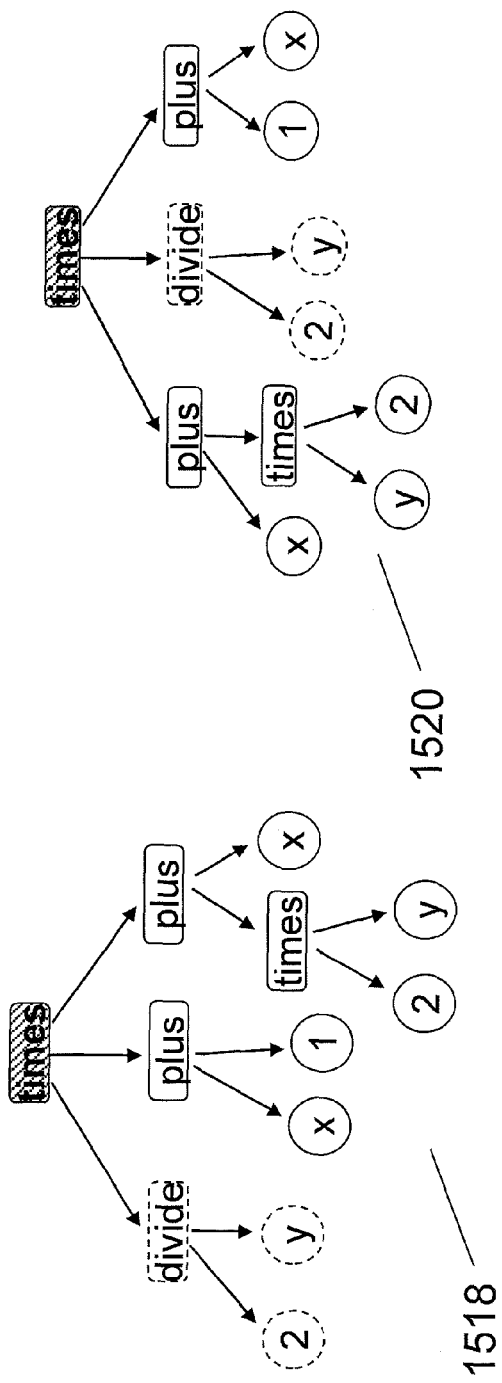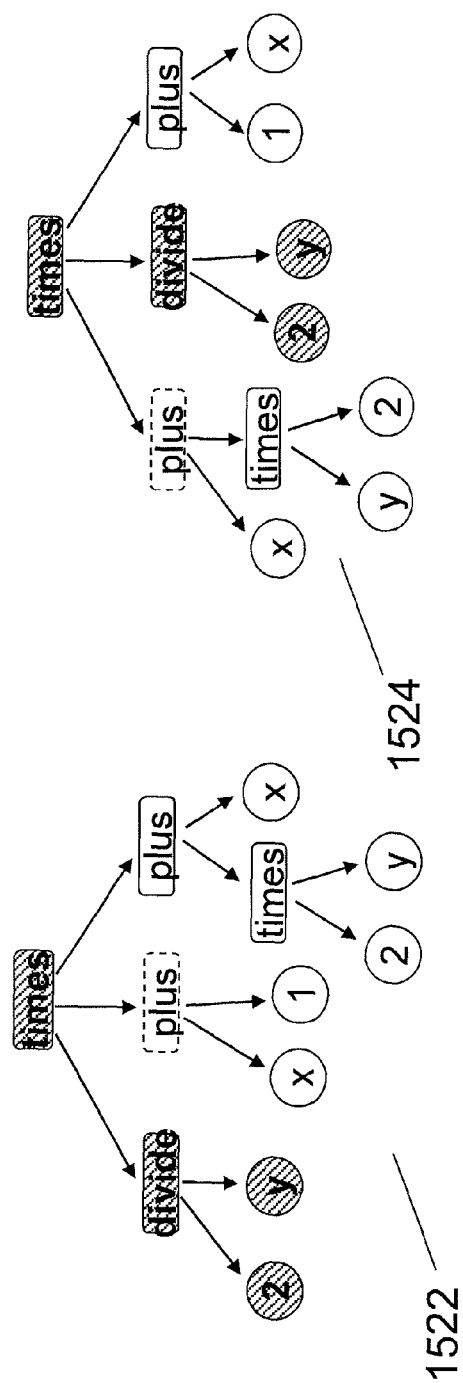
Figure 12E
Figure 12F

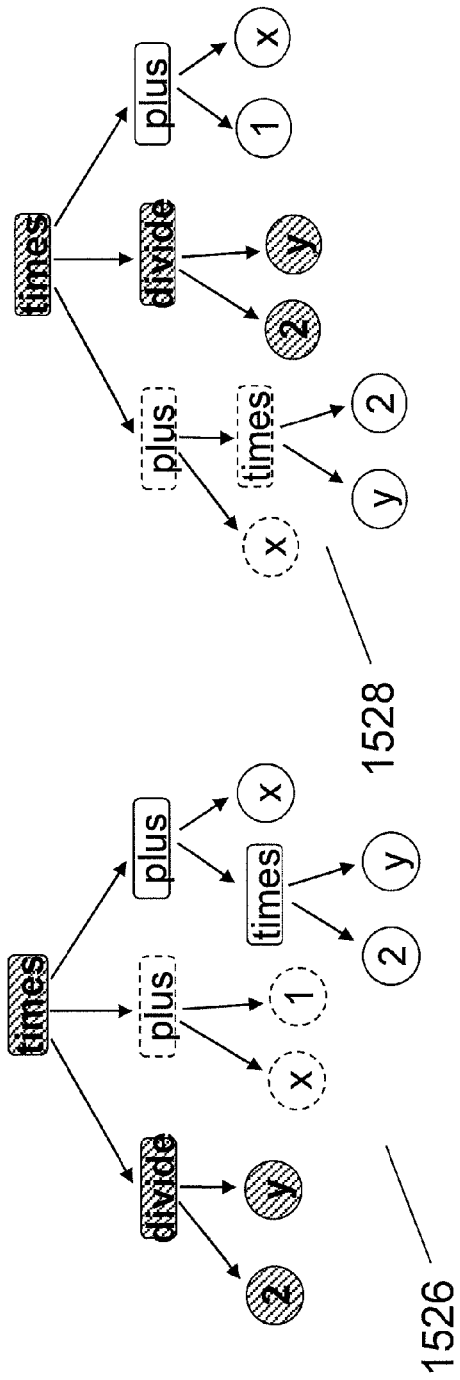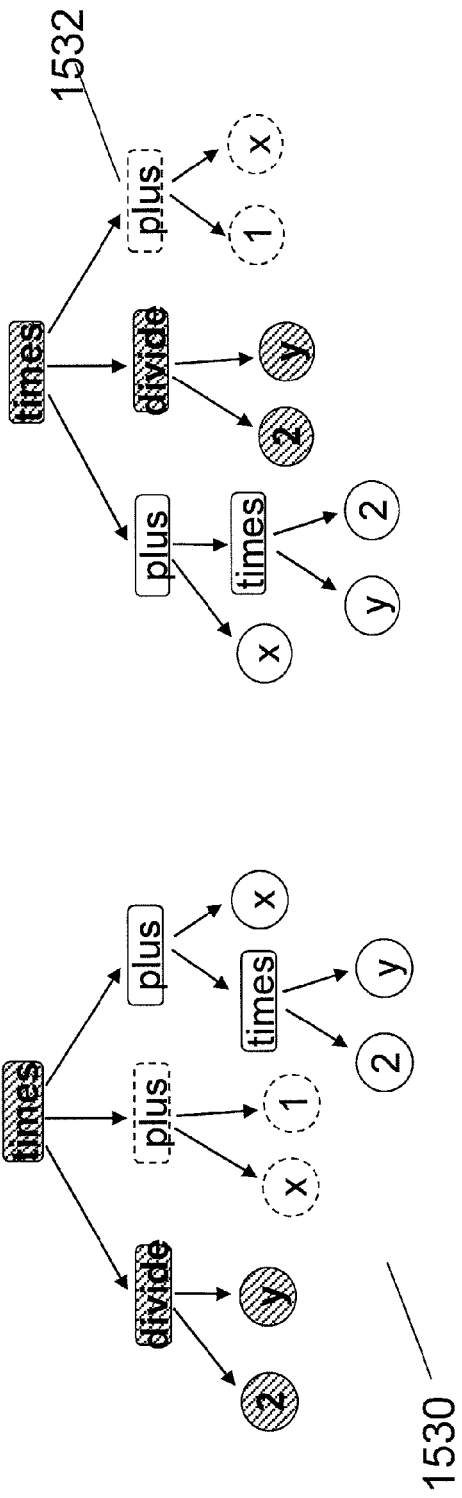
Figure 12G
Figure 12H

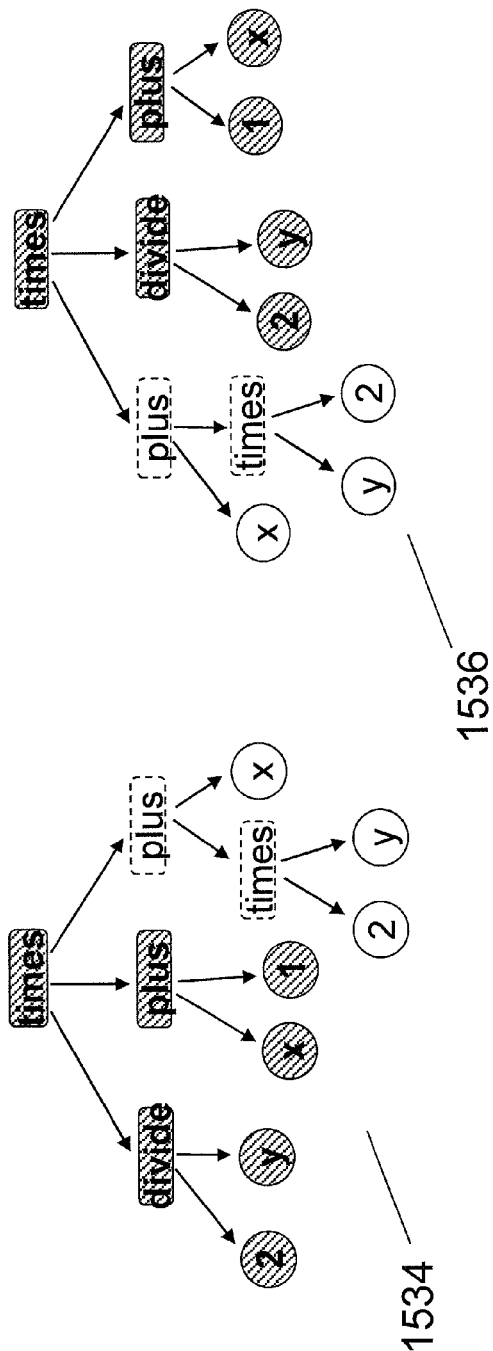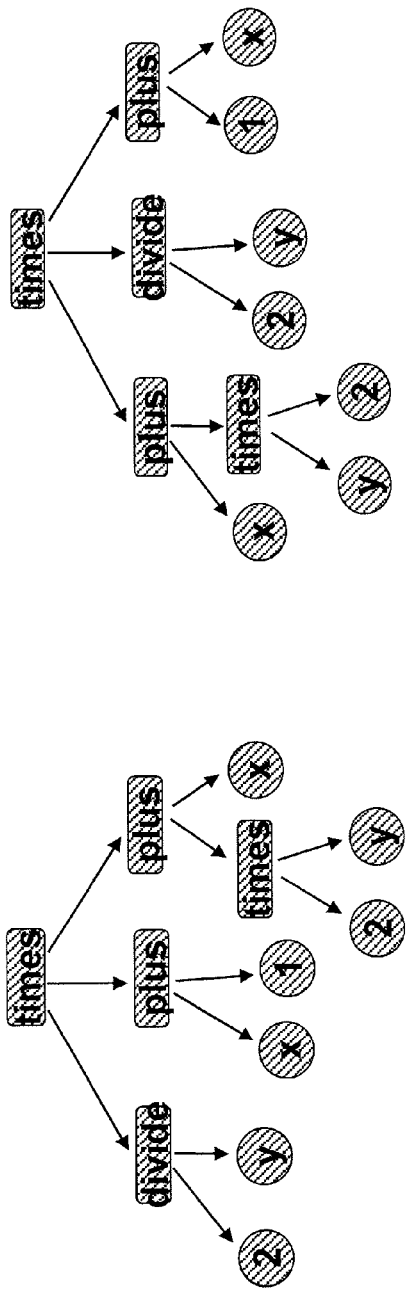
Figure 12I
Figure 12J

EQUATION-BASED ASSESSMENT GRADING METHOD AND PARTICIPANT RESPONSE SYSTEM EMPLOYING SAME

CROSS-REFERENCE TO RELATED APPLICATION

This application claims the benefit of U.S. Provisional Application Ser. No. 61/358,788 to LaBine et al. filed on Jun. 25, 2010 entitled "Equation-Based Assessment Grading Method and Participant Response System Employing Same", the entire content of which is incorporated by reference.

FIELD OF THE INVENTION

The present invention relates generally to participant response systems and in particular, to an equation-based assessment grading method and a participant response system employing same.

BACKGROUND OF THE INVENTION

Participant response systems for enabling participants of an event to enter responses to posed questions, motions or the like are well known in the art and have wide applicability. For example, during a conference, seminar or the like, participants can be provided with handsets that enable the participants to respond to questions, or to vote on motions raised during the conference or seminar. In the entertainment field, audience members can be provided with handsets that enable the audience members to vote for entertainment programmes or sports events. These participant response systems are also applicable in the field of education. Participants can be provided with handsets that enable the participants to answer questions posed during lessons, tests or quizzes. Of significant advantage, these participant response systems provide immediate feedback to presenters, facilitators, entertainment programme producers, or event organizers. With respect to the field of education, research shows that facilitators teach better and participants learn better when there is rapid feedback concerning the state of participants' comprehension or understanding. It is therefore not surprising that such participant response systems are gaining wide acceptance in the field of education.

Participant response systems fall generally into two categories, namely wired and wireless participant response systems. In wired participant response systems, the response devices used by participants to respond to posed questions or to vote on motions are typically physically connected to a local area network and communicate with a base or host computer. In wireless participant response systems, the response devices used by participants to respond to posed questions or to vote on motions communicate with the host computer via wireless communication links. Whether wired or wireless, many different types of participant response systems have been considered.

U.S. Pat. No. 4,247,908 to Lockhart, Jr et al. discloses a two-way communication system for use with a host computer that includes a control unit, a base station and multiple, hand-held, portable radio/data terminal units. The control unit interfaces directly with the host computer but uses a radio link to interface with the portable radio/data terminal units. Each portable radio/data terminal unit includes a two-way radio and a data terminal. The data terminal includes a keyboard for data entry and an LED display for readout of either received data or locally generated data. The host computer initiates communication through polling and/or selection of portable radio/data terminal units via the control unit. The control unit, in response to a "poll" from the host computer, answers by sending either a previously received message from a portable radio/data terminal unit, or if no message has been received, a "no message" response. Polling by the control unit is an invitation to the portable radio/data terminal units to send data to the control unit to be stored, grouped if necessary and sent on to the host computer. The control unit polls the portable radio/data terminal units by address in a particular sequence. The control unit transmits acknowledgements to the portable radio/data terminal units for received data on the next polling cycle.

U.S. Pat. No. 5,002,491 to Abrahamson et al. discloses an interactive electronic classroom system for enabling facilitators to teach participants concepts and to receive immediate feedback regarding how well the participants have learned the taught concepts. Structure is provided for enabling participants to proceed in lockstep or at their own pace through exercises and quizzes, responding electronically to questions asked, the facilitator being able to receive the responses, and to interpret a readout, in histogram or other graphic display form, of participant responses. The electronic classroom comprises a central computer and a plurality of participant computers, which range from simple devices to full fledged personal computers, connected to the central computer over a network. Optional peripheral hardware, such as video cassette recorders (VCRs) or other recording/reproducing devices, may be used to provide lessons to participants in association with the computer network.

U.S. Pat. No. 6,790,045 to Drimmer discloses a method and system for analyzing participant performance by classifying participant performance into discrete performance classifications associated with corresponding activities related to an electronic course. An observed participant performance level for at least one of the performance classifications is measured. A benchmark performance level or range is established for one or more of the performance classifications. It is then determined whether the observed participant performance level is compliant with the established benchmark performance level for the at least one performance classification. Instructive feedback is determined for the observed participant based upon any material deviation of the observed participant performance from at least one benchmark.

U.S. Patent Application Publication No. 2004/0072136 to Roschelle et al. discloses a method and system for assessing a participant's understanding of a process that may unfold over time and space. The system comprises thin client devices in the form of wireless, hand-held, palm-sized computers that communicate with a host workstation. The system provides a sophisticated approach of directing participants to perform self-explanation, and enables instructors to enhance the value of this pedagogical process by providing meaningful and rapid feedback in a classroom setting.

U.S. Pat. No. 6,381,444 to Aggarwal et al. describes a system for implementing a virtual class and distance education via a computer network. The process carried out by the system involves receiving signals from one or more instructor entities, the signals including lesson material designated as belonging to one or more interest groups. The lesson material is sent in advance to student entities listed in one or more of the interest groups to which the lesson material is designated as belonging. Signals from one or more student entities are received requesting admission to a particular class and instructions are sent to student entities to control the display and execution of the lesson material.

Current commercial response systems such as the ActivExpression™ produced by Promethean Limited of Blackburn, Lancashire, UK and CPSPulse™ produced by eInstruction of Denton, Tex., USA allow questions to be administered, the solutions to which are equations that must be entered as strings of text. Unfortunately, the grading engine that assesses the solutions to these questions performs simple string comparison. As a result, these systems require perfect matching of the entered solution to the instructor's solution potentially resulting in the errors in grading of the assessments.

A research paper presented at the $2^{nd}$ International Conference on Digital Information Management (ICDIM'07) held Oct. 28-31, 2007 entitled "Equivalence Detection Using Parse-tree Normalization for Math Search" authored by Shatnawi et al. describes a technique for searching for mathematical equations on the World Wide Web. The research paper describes the difficult challenge of determining mathematical equivalence between a search term and what may be presented on the Web. The research relates to implementing a technique that transforms a user's mathematical search query into a unique normalized form. Normalization is conducted in two ways, algebraic and structural.

Although prior art participant response systems allow questionnaires to be administered to participants and response data gathered, these participant response systems typically have limited functionality for grading equation-based assessments in a quick, automated manner. Grading of equation-based assessments can be prone to errors, as an equation-based question may have more than one correct solution. For example, the equation $y=2x^2-2$ may be correctly factored either as $2(x+1)(x-1)$ or as $2(x-1)(x+1)$. However, if a facilitator of a participant group defines the solution as $2(x+1)(x-1)$ and a participant enters a response of $2(x-1)(x+1)$, the participant's response may be graded as incorrect. Still other correct solutions to this question exist, which may also not be graded as correct when submitted as responses.

It is therefore an object of the present invention to provide a novel equation-based assessment grading method and a novel participant response system employing the method.

SUMMARY OF THE INVENTION

Accordingly, in one aspect there is provided a computerized assessment grading method comprising creating a syntax tree for a received equation-based response to at least one assessment question and a syntax tree for at least one solution to the at least one question; comparing the syntax trees; and grading the response based on the results of the comparison.

According to another aspect, there is provided a computerized assessment grading method comprising upon receipt of an equation-based response to an assessment question, creating a hierarchy of operators and operands based on the response; comparing the response hierarchy of operators and operands with a solution hierarchy of operators and operands; and grading the response based on the comparison.

According to another aspect, there is provided a participant response system comprising at least one response device, each response device having an input interface permitting a user to input an equation-based response to a question; and processing structure communicating with each response device, said processing structure, in response to a received response, executing a grading method that causes said processing structure to create a syntax tree for the received response, compare the response syntax tree with a solution syntax tree and grade the response based on the results of the comparison.

According to yet another aspect, there is provided an apparatus comprising a processing device; and memory storing computer program code, the processing device communicating with the memory and executing the computer program code causing the apparatus to, in response to a received equation-based response to an assessment question, create a syntax tree for the received response, compare the response syntax tree with a solution syntax tree and grade the response based on the results of the comparison.

According to still yet another aspect, there is provided a non-transitory computer readable medium embodying computer program code, which when executed causes a processing device to in response to a received equation-based response to an assessment question, create a syntax tree for the received response, compare the response syntax tree with a solution syntax tree and grade the response based on the results of the comparison.

BRIEF DESCRIPTION OF THE DRAWINGS

Embodiments will now be described more fully with reference to the accompanying drawings in which:

FIGS. 4A and 4B are side elevational and top plan views, respectively, of a transceiver forming part of the participant response system of FIG. 1;

FIG. 5 is a block diagram of the transceiver of FIGS. 4A and 4B;

FIGS. 12A to 12J are schematic diagrams of a response comparison process used by the participant response system of FIG. 1;

DETAILED DESCRIPTION OF THE EMBODIMENTS

Figure 1:
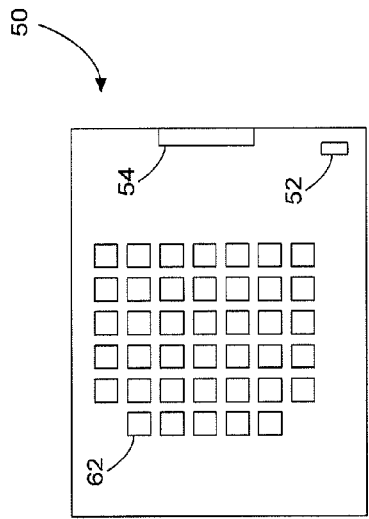
FIG. 1 is a schematic plan view of a participant response system.
Figure 2:
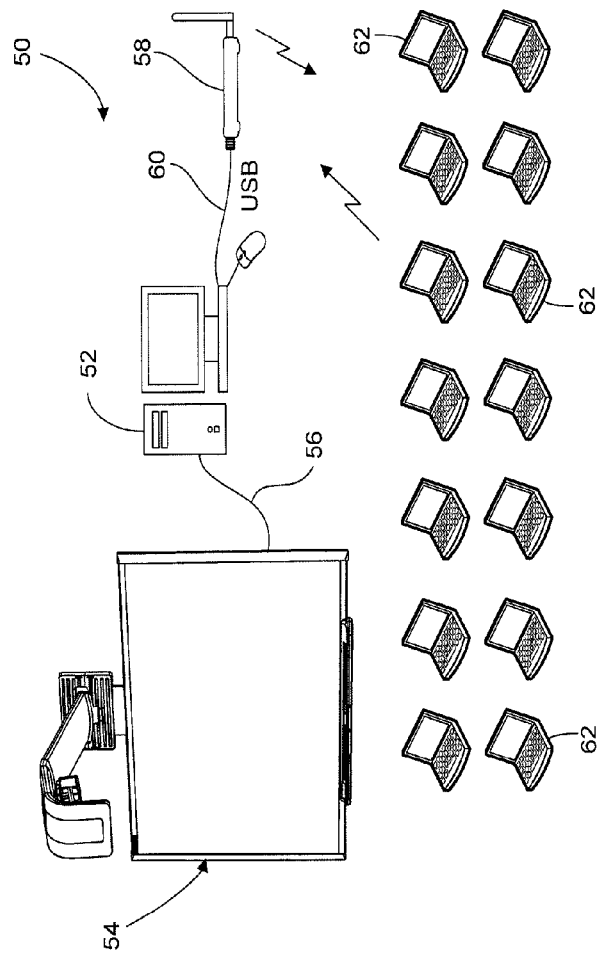
FIG. 2 is another schematic view of the participant response system of FIG. 1.

Turning now to FIGS. 1 and 2, a participant response system is shown and is generally identified by reference numeral 50. In this embodiment, participant response system 50 is employed in a classroom, lecture hall or theatre of an educational institution such as for example a school, university, college or the like. As can be seen, the participant response system 50 comprises a base or host computer 52, an interactive whiteboard (IWB) 54 physically connected to the host computer 52 via a cable 56, a radio frequency (RF) transceiver 58 physically connected to the host computer 52 via a universal serial bus (USB) cable 60, and a plurality of wireless response devices 62 communicating with the host computer 52 via the transceiver 58.

In this embodiment, the host computer 52 is a desktop computer, but may alternatively be a laptop or tablet computer, a personal digital assistant (PDA) or other handheld device, or any other suitable computing device. The host computer 52 is identified by a unique ID, which may be the computer's media access control (MAC) address or its network address. In this embodiment, the response devices 62 are laptop computers, but may alternatively be desktop computers, tablet computers, PDAs, hand-held computing devices such as iPhones, iPads, etc., portable media devices, dedicated response units and/or other response devices having one or more control/processing units, storage, wired or wireless communication interfaces and input interfaces such as keypads or touch screen interfaces. Each response device 62 has a unique ID.

The participant response system firmware in this embodiment is implemented on top of IEEE802.11b/g/n MAC protocol layer software provided by Texas Instruments Incorporated (TI) of Texas, USA or other suitable supplier of this technology. The TI MAC protocol layer software comprises a small real-time kernel protocol stack to provide simple real-time operating system (OS) facilities such as for example, timer management, task management and interrupt management. Abstraction layers are used to separate the OS and the hardware drivers for ease of porting to a different OS and hardware platform.

Figure 3:
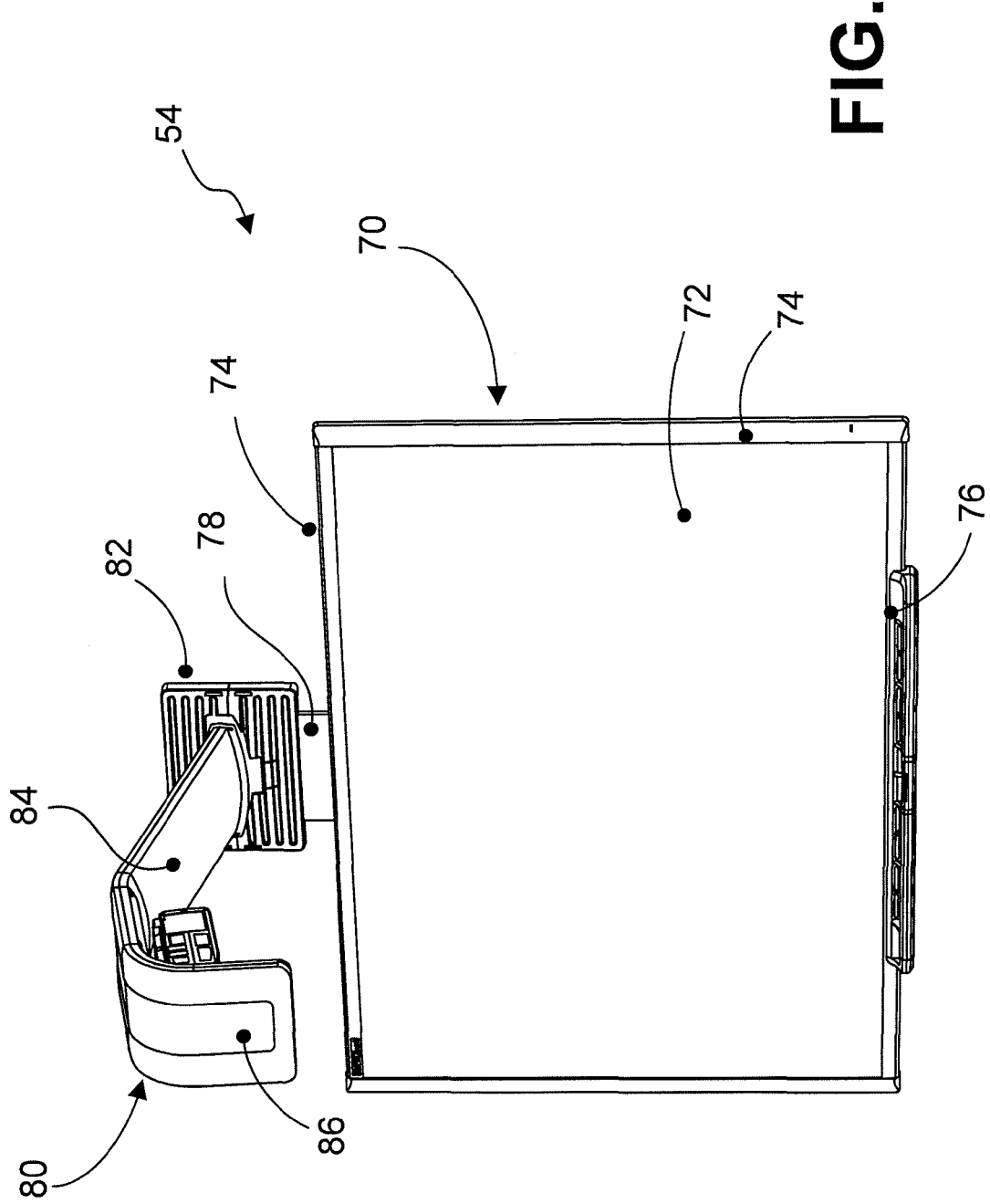
FIG. 3 is a perspective view of an interactive whiteboard forming part of the participant response system of FIG. 1.

In this embodiment, the IWB 54 is a 600i series interactive whiteboard manufactured by SMART Technologies ULC, of Calgary, Alberta, Canada assignee of the subject application. As is best seen in FIG. 3, the IWB 54 comprises a large, analog resistive touch screen 70 having a touch surface 72 that is surrounded by a bezel 74. A tool tray 76 is affixed to the bezel 74 adjacent the bottom edge of the touch surface 72 and accommodates one or more tools that are used to interact with the touch surface. The touch screen 70 is mounted on a wall surface via a mounting bracket 78. A boom assembly 80 is also mounted on the wall surface above the touch screen 70 via the mounting bracket 78. The boom assembly 80 comprises a speaker housing 82 accommodating a pair of speakers (not shown), a generally horizontal boom 84 extending outwardly from the speaker housing 82 and a projector 86 adjacent the distal end of the boom 84. The projector 86 is aimed towards a mirror (not shown) supported by the boom 84 which reflects the projected image back towards the touch screen 70 so that the image projected by the projector 86 is presented on the touch surface 72.

The transceiver 58 is better illustrated in FIGS. 4A, 4B and 5. As can be seen, the transceiver 58 comprises a casing 100 adapted to be desktop or wall mounted. An L-shaped omni-directional antenna 102 is mounted on the front end of the casing 100. The rear end of the casing 100 receives the USB cable 60 via a connector 104. A plurality of light emitting diodes (LEDs) 106 is provided on the top surface of the casing 100 with the LEDs being illuminated to provide visual feedback concerning the operational status of the transceiver 58. In this embodiment, the LEDs 106 comprise a power status LED and communications status LEDs. Alternatively, the transceiver 58 may provide visual feedback via a display such as a liquid crystal display (LCD) or via both LEDs and an LCD. The transceiver electronics are accommodated by the casing 100 and comprise a microprocessor 110 that communicates with non-volatile, random access memory (NVRAM) 112, an LED driver 114 and a USB-UART bridge 116. Power is provided to the transceiver 58 via the USB cable connection. Depending on design requirements, commercial wireless transceivers such as wireless routers may also be used as the transceiver 58.

The host computer 52 runs SMART Notebook™ whiteboarding software, offered by SMART Technologies ULC, providing a graphical user interface and facilitating interaction with the IWB 54. As a result, the display output of the host computer 52 is conveyed to the IWB 54 and is used by the projector 86 to present an image on the touch surface 72. Pointer interactions with the touch surface 72 are detected by the touch screen 70 and conveyed to the host computer 52. The display output of the host computer 52 is in turn adjusted by the host computer 52 as required to reflect the pointer activity. Depending on the nature of the pointer activity, the host computer 52 may treat the pointer contacts as writing or erasing or may treat the pointer contacts as mouse events and use the mouse events to control execution of application programs executed by the host computer 52.

The host computer 52 also runs SMART Response™ CE Teacher software, offered by SMART Technologies ULC. SMART Response™ CE Teacher software is generally intended for use by a facilitator of a group of participants to create rich multi-media assessments. In this embodiment, the facilitator is a teacher and the group of participants are students of a class, however it will be understood that other facilitator and participant scenarios are possible. In this embodiment, the assessment comprises one or more equation-based questions each having a respective equation-based answer. The questions and answers are stored in a standard, solvable format such as MathML or other format known to those of skill in the art. This question and answer information is added to the computer readable SMART Notebook™ file as extensible markup language (XML) information and is stored with all questions as part of a larger assessment or as a single question. The SMART Response™ CE Teacher software enables the host computer 52 to provide the assessment via the USB cable 60 to the transceiver 58 for distribution to the response devices 62.

In this embodiment, the response devices 62 run SMART Response™ CE Student software offered by SMART Technologies ULC, providing a graphical user interface on which the assessment is presented. In this embodiment, and as shown in FIG. 2, the host computer 52, IWB 54 and transceiver 58 are physically connected by cables 56 and 60. Messages exchanged between the host computer 52, IWB 54 and transceiver 58 are structured using extensible markup language (XML) over HTTP. The transceiver 58 and the response devices 62 communicate over a wireless radio frequency (RF) communications network. The microprocessor 110 of the transceiver 58 thus provides both a USB interface and an RF interface and runs a service that translates messages in USB protocol to messages in radio frequency (RF) wireless protocol and vice versa as well as IEEE802.15.4 MAC layer software to manage the IEEE802.15.4 network thereby to permit the host computer 52 and response devices 62 to communicate. Messages exchanged between the host computer 52 and the transceiver 58 comprise a header, a command identification, message bytes and a checksum. Consistent overhead byte stuffing is employed to provide frame delimiting of packets thereby to facilitate the determination of the start and end of command packets. Messages exchanged between the transceiver 58 and the response devices 62 do not include the header and the checksum as the IEEE802.15.4 protocol is used to handle packet addressing and ensure packet integrity.

Figure 6A:
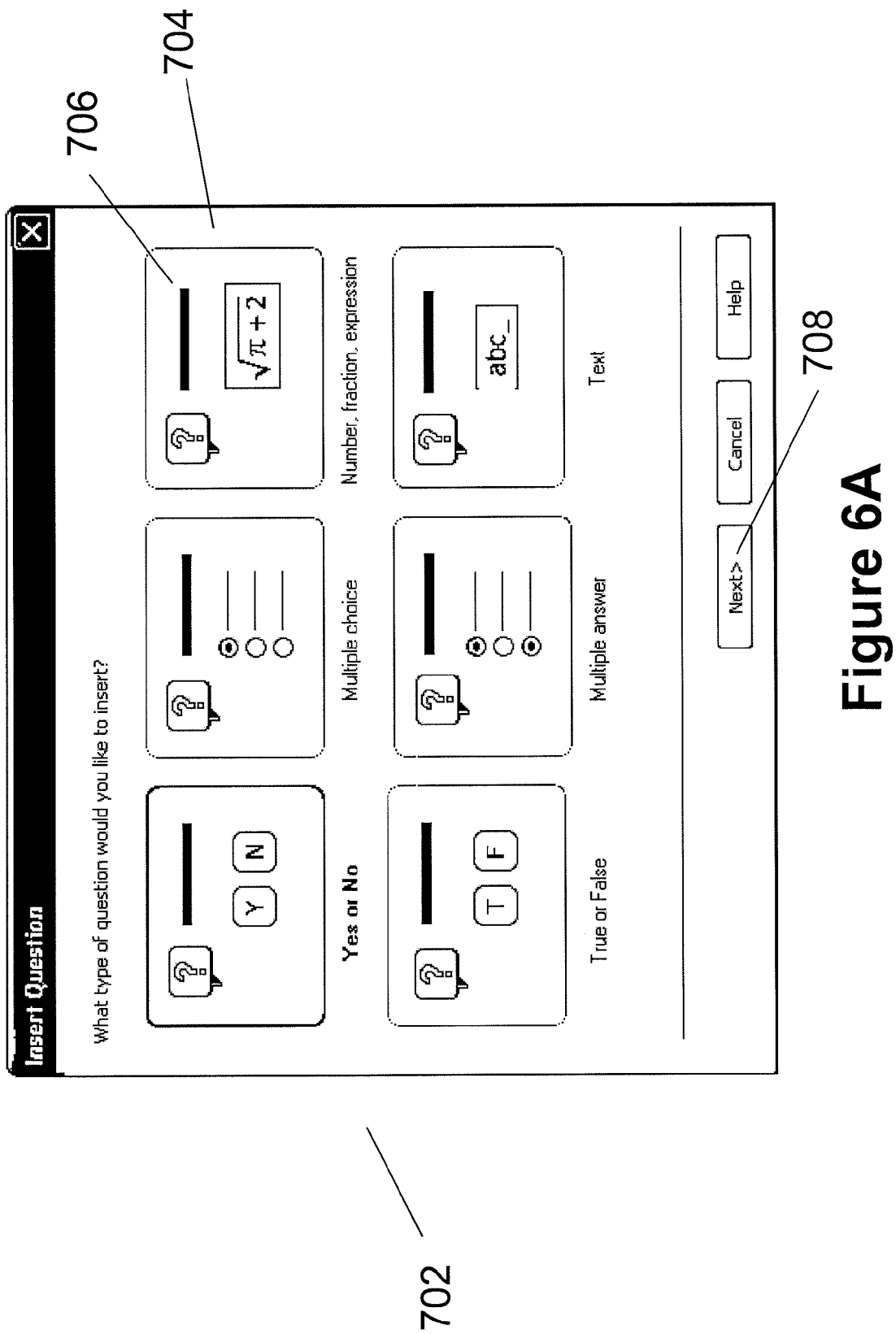
FIG. 6A is a Question Type Selection window presented by the participant response system of FIG. 1.
Figure 6B:
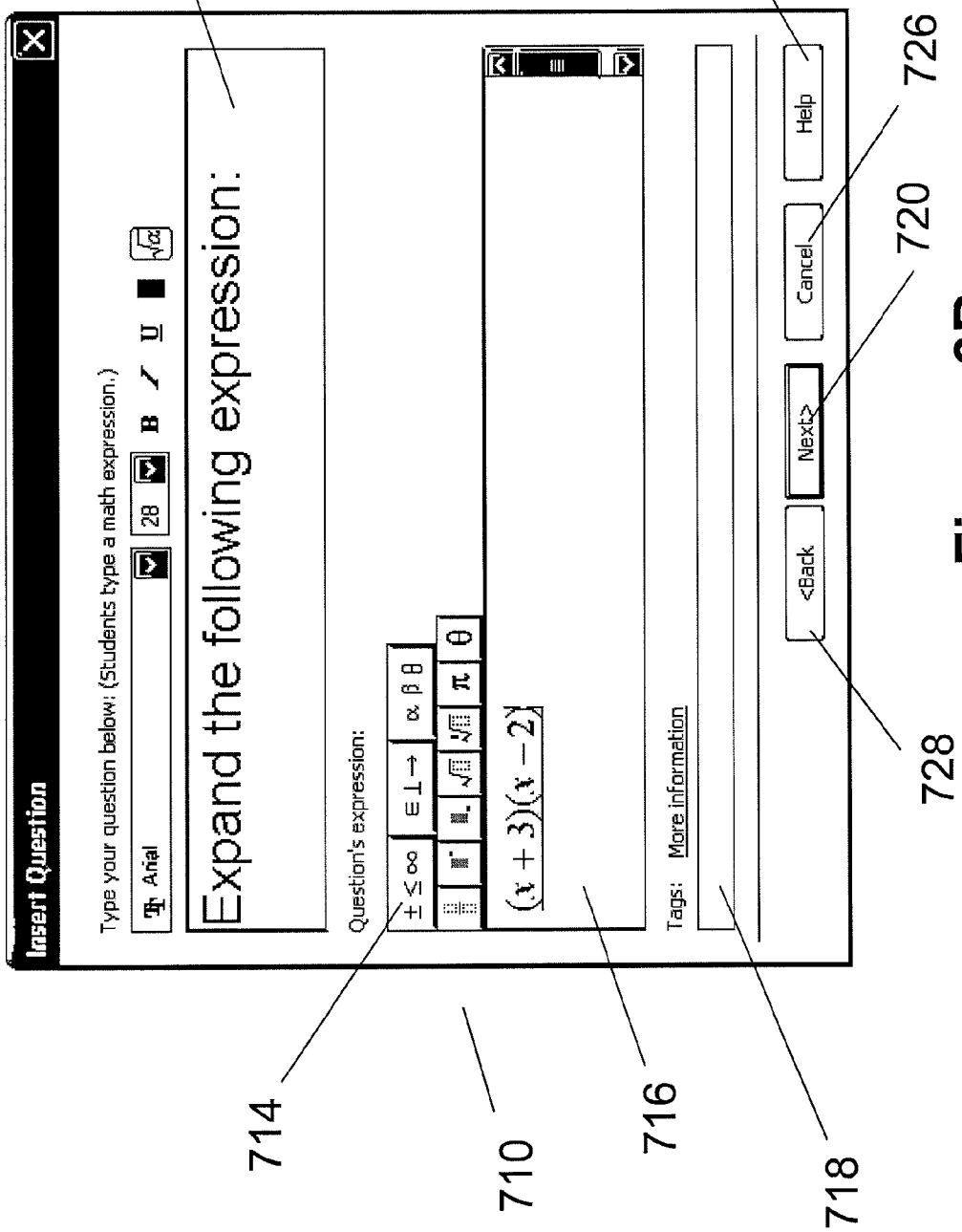
FIG. 6B is a Question Input window presented by the participant response system of FIG. 1.
Figure 6C:
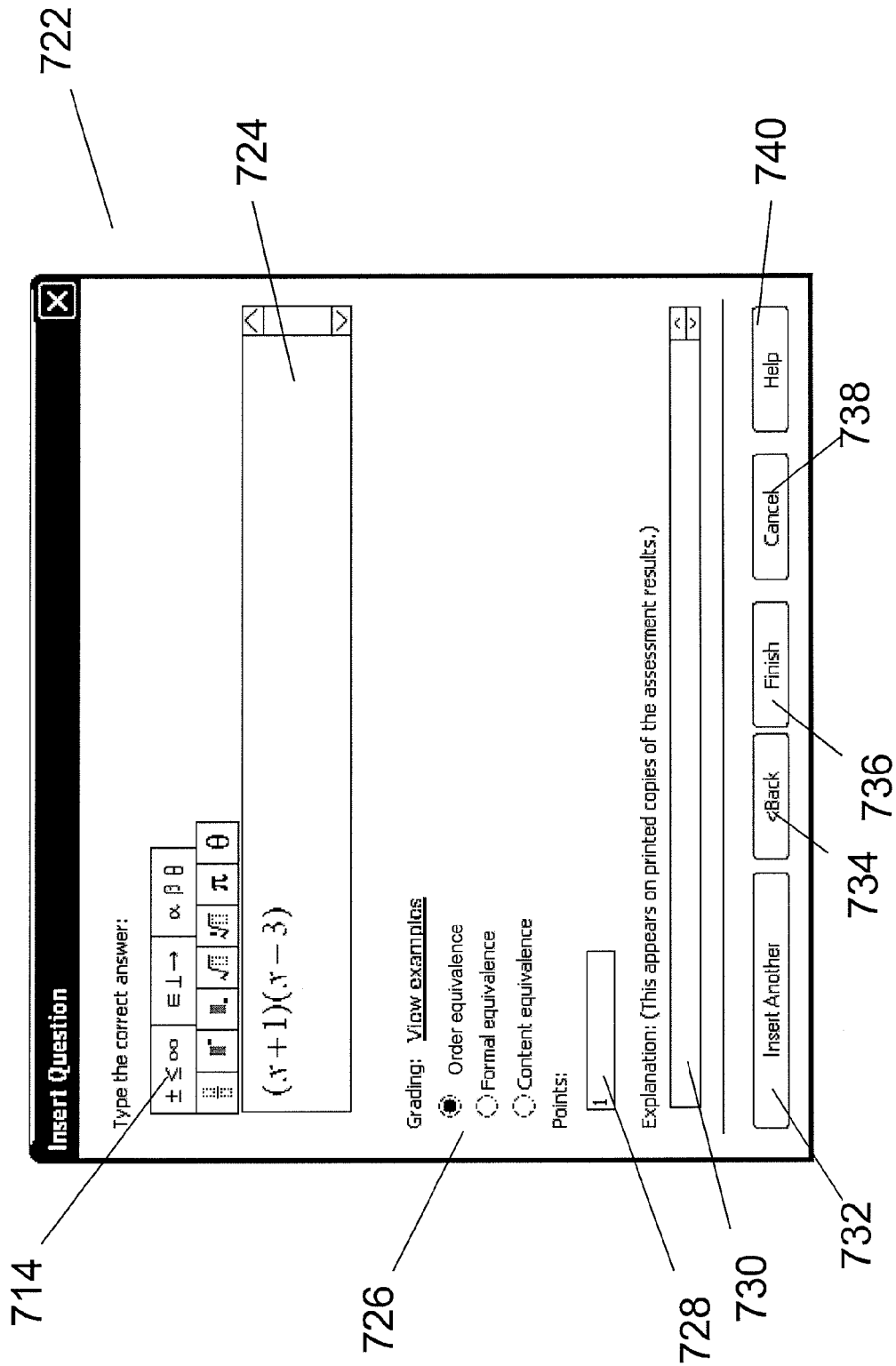
FIG. 6C is a Solution Input window presented by the participant response system of FIG. 1.

Turning now to FIGS. 6A to 6C, windows forming part of the user interface for SMART Notebook™ software with SMART Response™ CE Teacher, and presented by the participant response system 50, are shown. FIG. 6A shows a Question Type Selection window 702, which comprises various buttons 704 that may each be selected to designate a question type for a question of an assessment. For example, selection of button 706 designates the question as a "Number, fraction, expression" type. Question Type Selection window 702 also comprises buttons 708, which may be selected to execute "next", "cancel" and "help" functions. Selecting one of the buttons 704 and selecting the "next" button brings up a Question Input window 710, which is shown in FIG. 6B. Question Input window 710 comprises a question description textbox 712 in which a description of the question in the form of text may be entered, such as by a keyboard. Question Input window 710 also comprises an question entry box 716 in which an equation portion of the question may be entered using the keyboard and using character buttons 714. Character buttons 714 comprise a variety of characters such as Greek characters, fractions, mathematical operators, and subscripts/superscripts. Question Input window 710 further comprises a tag entry box 718, in which a brief description or tag (e.g. "factoring") may be entered for facilitating retrieval of the question once it has been stored. Question Input window 710 further comprises a set of function buttons including a "next" button 720, a "help" button 724, a "cancel" button 726, and a "back" button 728, which each may be selected to execute their associated functions, as will be understood by one of ordinary skill in the art. Entering a question by inputting entries into any of textbox 712 and equation entry box 716, and selecting the "next" button 720 brings up a Solution Entry window 722, which is shown in FIG. 6C.

Solution Entry window 722 comprises a solution textbox 724 in which a solution may be entered using the keyboard and using character buttons 714. Solution Entry window 722 also comprises a set of grading buttons 726, which may be selected to designate the grading method to be used for grading the assessment. In this embodiment, grading buttons 726 allow selection of one of an Order Equivalence grading method, a Formal Equivalence grading method, and a Content Equivalence grading method. These different grading methods are discussed further below. Solution Entry window 722 also comprises a score entry box 728, which may be used to enter the number of points or score awarded for answering the question. Solution Entry window 722 also comprises an explanation box 730, which may be used to enter additional information that is to be displayed once the question has been answered. For example, such additional information may comprise an explanation of the steps required to arrive at the correct solution. Solution Entry window 722 further comprises a set of function buttons including a "finish" button 736, a "help" button 740, a "cancel" button 738, and a "back" button 734, which each may be selected to execute their associated functions, as will be understood by one of ordinary skill in the art. Entering a solution into solution textbox 724 and selecting the finish button 736 causes the solution to be converted to a LaTeX solution expression, which is used later during grading as will be described. Multiple questions may be inserted into a single SMART Notebook™ page or there may be a single question per page.

Figure 7:
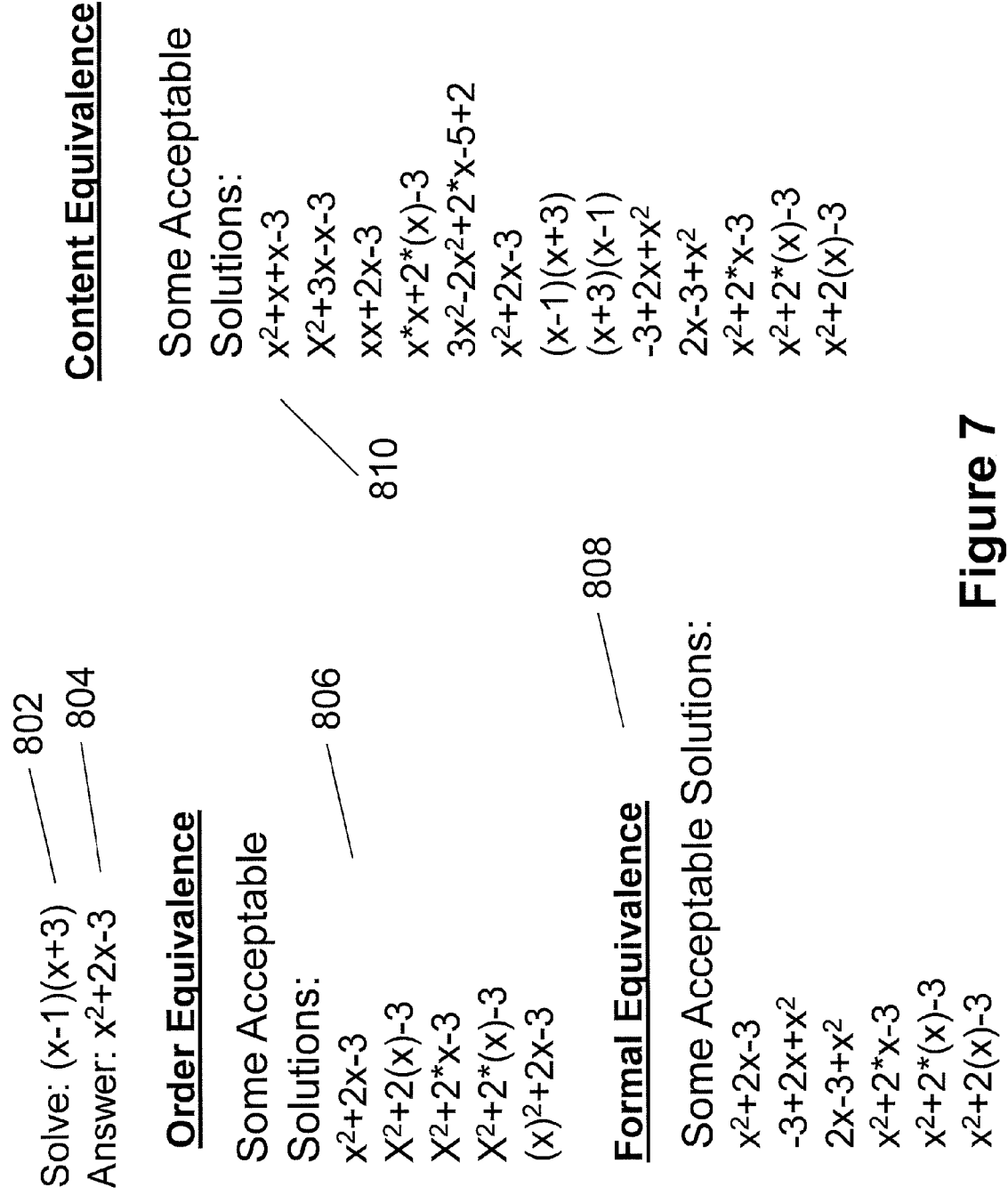
FIG. 7 is a list of examples of possible solutions to an equation-based question.

FIG. 7 shows several examples of possible solutions to an equation-based question, and accordingly illustrates the different grading methods used by the participant response system 50. In the embodiment shown, a question 802 and a solution 804 have been entered using the Question Type Input window 702, the Question Entry window 710, and the Solution Entry window 722. Table 806 lists several examples of responses to question 802 that are be considered to be correct using the Order Equivalence grading method. The Order Equivalence grading method requires responses to have the same terms in the same order as the solution 804, however redundant brackets, spacing and operator equivalence such as *, x and × for multiplication are also considered in determining if the response is correct. For the example shown, a response of $-3+2x+x^2$ would be graded as incorrect by the Order Equivalence grading method, as terms of this response are not in an appropriate order.

Table 808 lists several examples of responses to question 802 that are considered to be correct using the Formal Equivalence grading method. The Formal Equivalence grading method requires responses to have the same number of terms/operands and comparable operators as the solution 804, but the terms may be in any order. Again, redundant brackets, spacing and operator equivalence are all considered in determining if the response is correct. For the example shown, a response of x×x+x+x−3 would be graded as incorrect by the Formal Equivalence grading method, as the number of terms (four (4)) differs from that of the solution 804 (three (3)), and the term equivalent to $x^2$ has not been reduced.

Table 810 lists several examples of responses to question 802 that are considered to be correct using the Content Equivalence grading method. The Content Equivalence grading method requires responses and the solution to describe the same mathematical entity, but the responses and the solution may contain different terms/operands and/or different operators in different orders. The Content Equivalence grading method is therefore more flexible than the Order Equivalence and Formal Equivalence grading methods. It will be noted that when using the Formal Equivalence and Order Equivalence grading methods, a response that is identical to the question is considered to be incorrect. In contrast, when using the Content Equivalence grading method, there are cases in which a response that is identical to the question will be considered to be correct.

Figure 8:
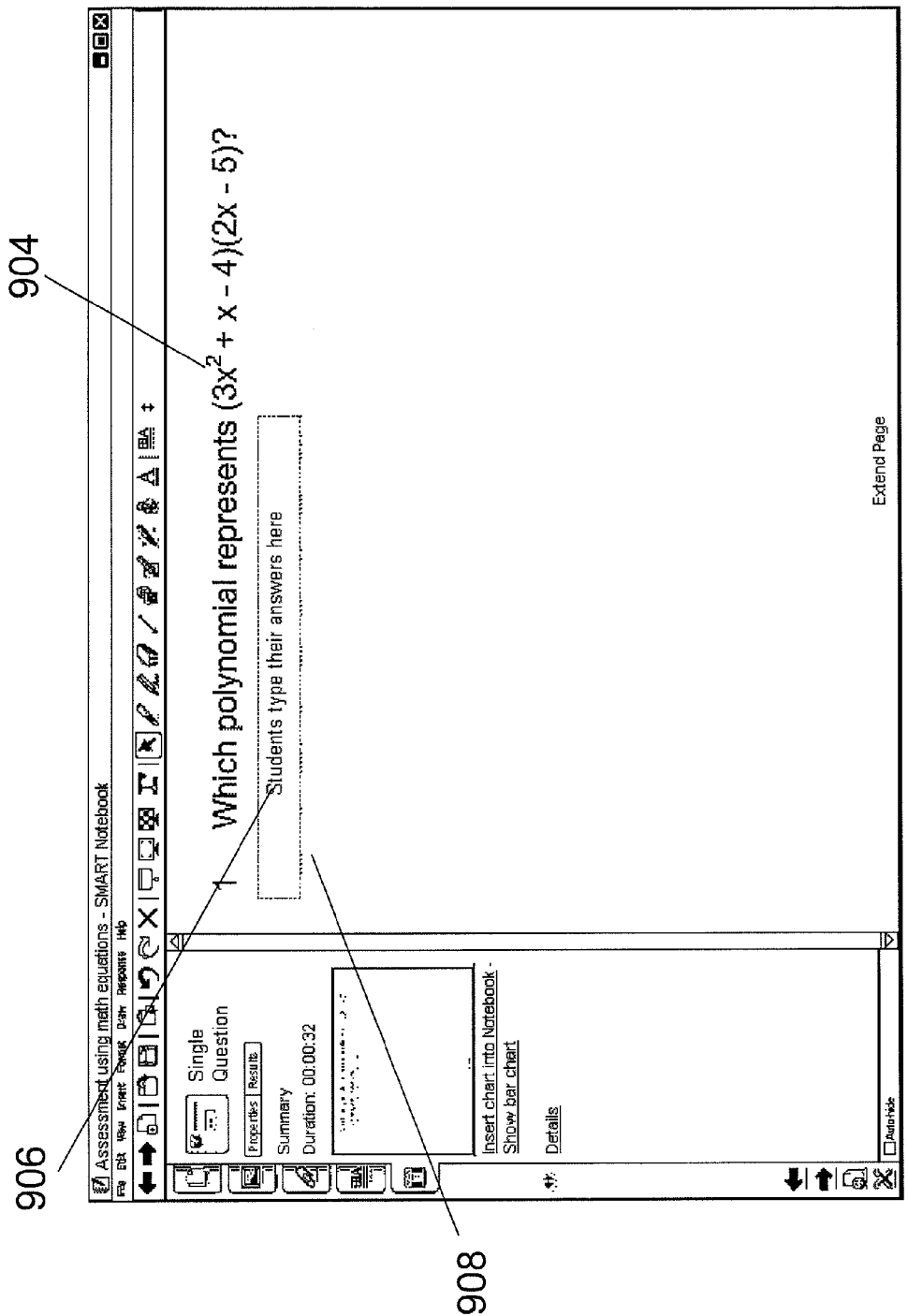
FIG. 8 is a Participant Input window presented by the participant response system of FIG. 1.

FIG. 8 shows a participant response window 902 presented on a response device 62. In this embodiment, Participant response window 902 is a SMART Notebook™ page presented by the SMART Response™ CE student software. Participant response window 902 comprises a display box 904 that displays a question to be answered by the participant and is rendered by a Math Typeset Equation Renderer. Participant response window 902 also comprises a response entry field 906 within a response entry textbox 908, in which a response may be entered.

Figure 9:
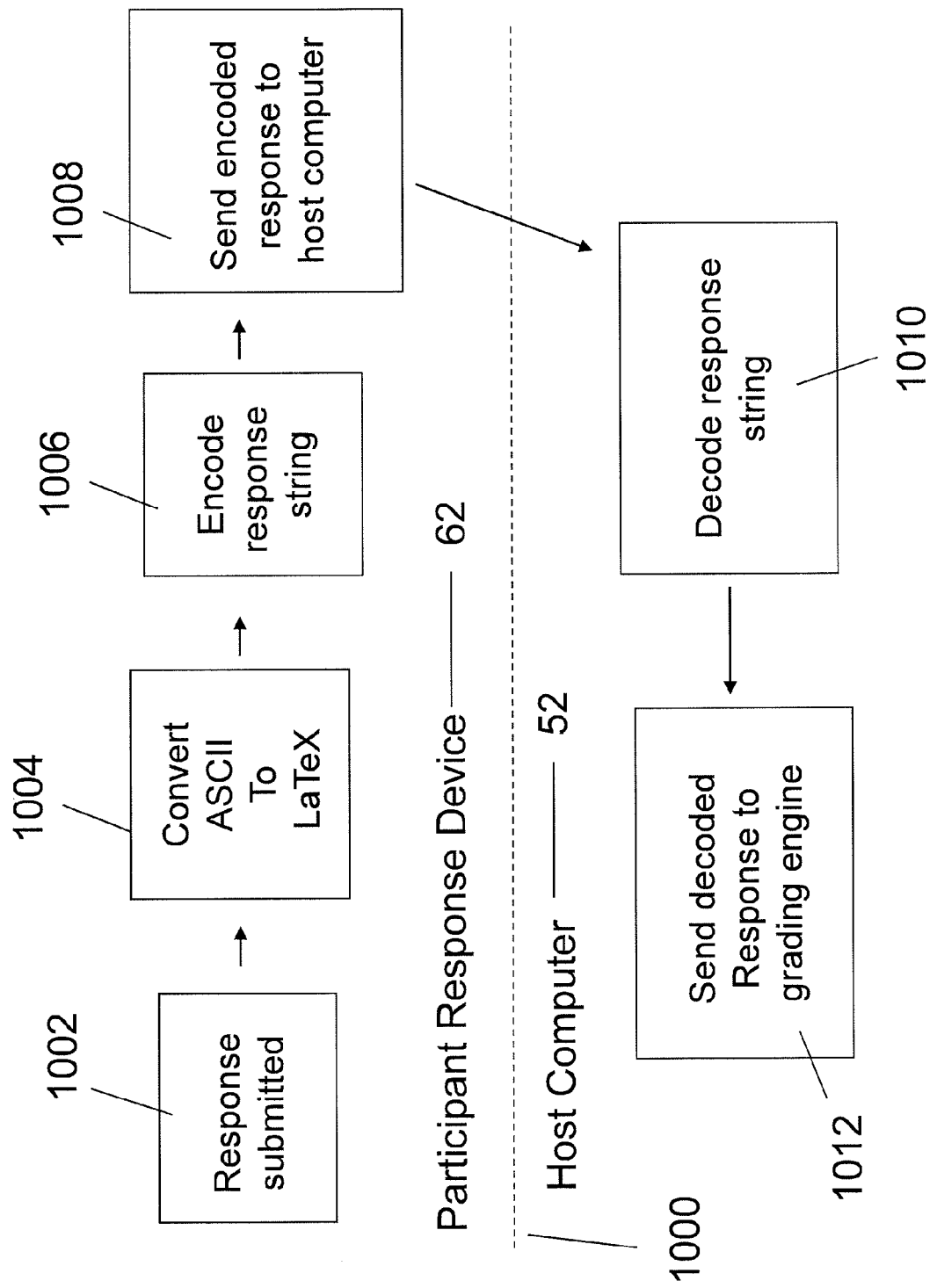
FIG. 9 is a flowchart showing steps of a response input process used by the participant response system of FIG. 1.

FIG. 9 is a flowchart of a response input process used by the participant response system 50. The dashed line 1000 indicates a separation of functions that are carried out by a response device 62 and by the host computer 52. When a response entered into a response device 62 is to be submitted to the host computer (step 1002), the entered response is converted into a LaTeX response string from ASCII (step 1004). The LaTeX response string is then encoded into numeric data using a symbol dictionary (step 1006) and is then compressed for transmission to the host computer 52 via transceiver 58. For example, during this encoding, LaTeX "\frac" would be replaced by "200" and LaTeX "{" would be replaced by "201". The encoded and compressed LaTeX response string is then transmitted by the response device 62 to the host computer 52 via transceiver 58 (step 1008). In this embodiment, the response string comprises one or more responses to one or more questions presented on one or more SMART Notebook™ pages of the assessment. The host computer 52 receives the encoded and compressed LaTeX response string, and then decompresses and decodes the response string into a LaTeX response expression (step 1010) using a PC Symbol dictionary and a LaTeX decoder. For example, during this decoding, "200" would be replaced by "\frac" and "201" would be replaced by "{". The decoded LaTeX response expression is then processed by an xThink Engine, licensed from xThink, Inc of Round Rock, Tex., USA, for interpretation and grading (step 1012). Those of skill in the art will understand that the mapping of LaTeX to numerical values is arbitrary as long as the encoding symbol dictionary on the response device 62 and the decoding symbol dictionary on the host computer 52 are equivalent.

Figure 10:
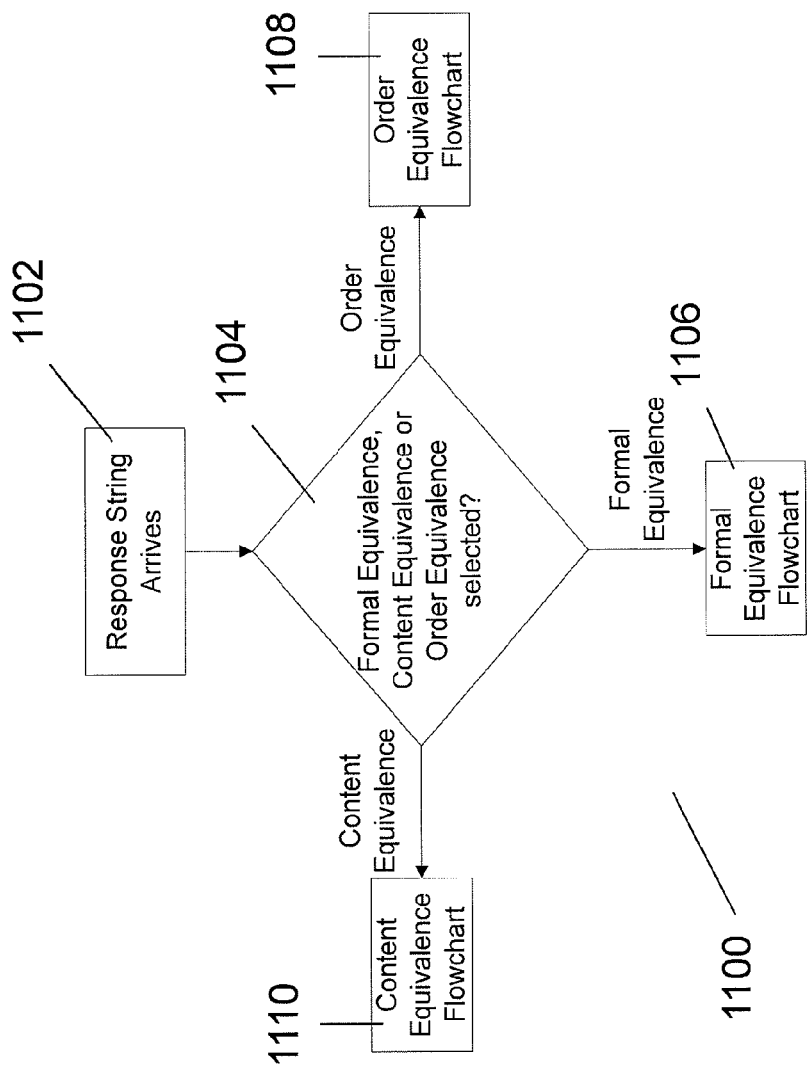
FIG. 10 is a flowchart showing steps of a response analysis process used by the participant response system of FIG. 1.

FIG. 10 is a flowchart showing steps of a response analysis process used by the participant response system 50. When a LaTeX response expression has been received by the xThink Engine (step 1102), the Xthink Engine determines the grading method that has been selected for grading the response expression (step 1104). The xThink Engine then proceeds to grade the LaTeX response expression accordingly using either an Order Equivalence grading algorithm (step 1106), a Formal Equivalence grading algorithm (step 1108), or a Content Equivalence grading algorithm (step 1110).

Figure 11:
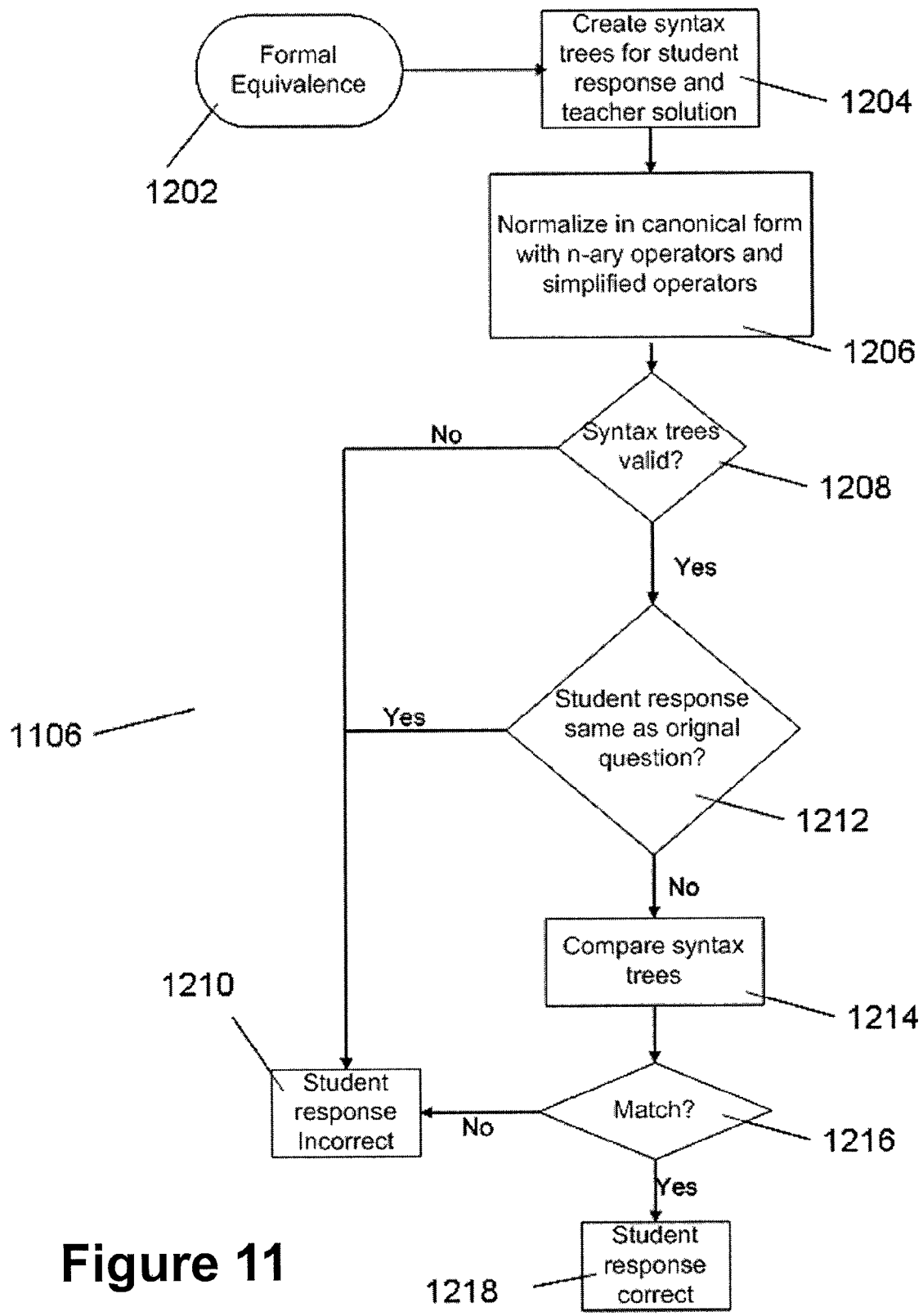
FIG. 11 is a flowchart showing steps of a Formal Equivalence algorithm used by the participant response system of FIG. 1.

FIG. 11 is a flowchart showing steps performed during execution of the Formal Equivalence grading algorithm generally indicated using reference numeral 1106. Formal Equivalence grading algorithm 1106 determines if the LaTeX response expression and the solution expression comprise the same terms (operands) and operators (i.e. are "formally equivalent"). In particular, during execution, the Formal Equivalence grading algorithm begins by generating a logical syntax tree for both the LaTeX response expression and the solution expression (step 1204). The LaTeX response and solution expressions are each parsed into a tree-shaped hierarchy of operators and operands based generally on the order of operations, with the first operations to be performed occurring at the bottom of the syntax tree and the last operations to be performed occurring at the top of the syntax tree. The syntax trees are then normalized into a canonical form where common operators are simplified to a single n-ary operator as opposed to traditional binary operators (step 1206). For example, the equation x+y−1 would be reduced to a + operator and a three-operand syntax tree having operands of x, y, and −1. Similar terms are grouped in alphabetical order (a to z) followed by decreasing numerical value (e.g. 2 before 1), with more complex terms first, followed by less complex terms. For example, the term $x^2$ is entered into the syntax tree prior to the term x.

The normalized syntax trees are then evaluated to determine if they are mathematically valid (step 1208). For example, the expression ")x+" does not give rise to a valid syntax tree due to an incorrect usage of brackets, and due to the fact that the operator has only one operand. If the response syntax tree is determined not to be mathematically valid, then the response is graded as incorrect (step 1210). At step 1208, if the syntax trees are mathematically valid, the response expression is then evaluated to determine whether or not it matches the equation of the question (step 1212). If the response expression matches the equation of the question, then the response is graded as incorrect (step 1210). In this embodiment, when a response is graded as incorrect, a score of zero is issued for that response.

Figure 12C:
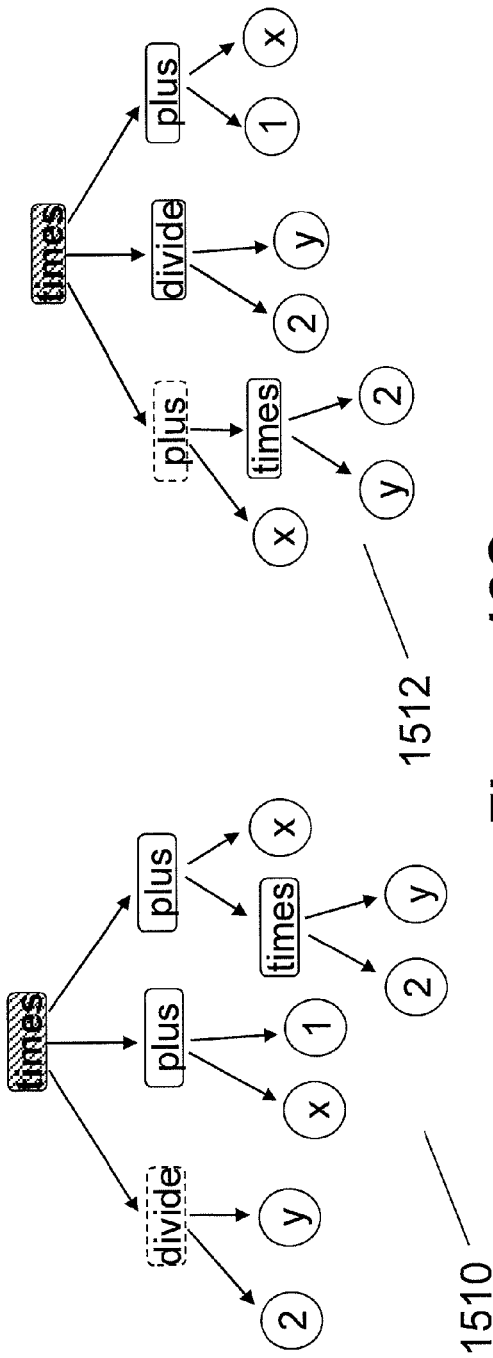
Figure 12D:
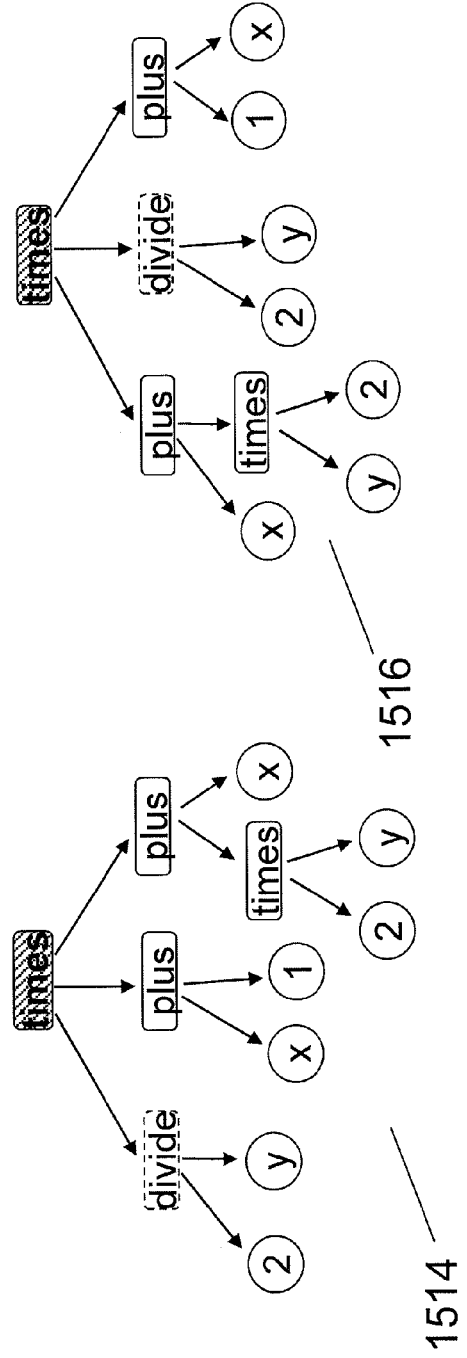

Following step 1212, the solution syntax tree and the response syntax tree are compared (step 1214). The same initial nodes of the two syntax trees are selected, and a traversal of each syntax tree is then carried out. As will be understood by one of ordinary skill in the art, this step is akin to the process used for "depth-first" searching. For each node of the syntax trees, a comparison between the solution syntax tree and the response syntax tree is conducted. FIGS. 12A to 12H illustrate an example of this traversal and comparison. FIG. 12A shows a solution syntax tree 1502 and a response syntax tree 1504, respectively, which have been generated for a solution expression 1502a and a response expression 1504a. In FIG. 12B, the roots 1502b and 1504b of syntax trees 1502 and 1504, respectively, are compared to determine if these two nodes are the same. In FIG. 12C, it is determined through the comparison that the multiplication operators are the same for both the solution syntax tree and the response syntax tree, as indicated by hashing. A comparison of the divide and plus operands is then undertaken. As these are not the same for syntax trees 1502 and 1504, and as there are two additional nodes at this syntax tree level, the comparison then proceeds to the next node at this syntax tree level. At this point, the two divide operands 1514 and 1516 of syntax trees 1502 and 1504, respectively, are compared and are confirmed to be the same, as shown in FIG. 12D. The nodes below divide operands 1514 and 1516 are then compared, and are confirmed to be the same, as shown in FIG. 12E. The next plus node 1522 in the solution syntax tree 1502 is compared to the previously passed-over plus node 1524 in the response syntax tree 1504 as shown in FIG. 12F. As these operators are identical, the Formal Equivalence grading algorithm proceeds to compare the children nodes 1526 and 1528 of plus nodes 1522 and 1524, respectively, as shown in FIG. 12G. As these children nodes do not match, the plus nodes 1522 and 1524 are not confirmed to be the same. The next node in the response syntax tree 1504, namely plus node 1532, is compared with plus node 1522, as shown in FIG. 12H. As these nodes are the same, the last branch of the syntax trees 1502 and 1504 are compared, as shown in FIG. 12I. The remaining nodes 1534 and 1536 at this syntax tree level are then compared. As nodes 1534 and 1536, together with all of the children nodes, are confirmed by the Formal Equivalence grading algorithm to be the same, the syntax trees 1502 and 1504 are determined to match as they comprise the same nodes, as shown in FIG. 12J.

Returning to FIG. 11, the Formal Equivalence grading algorithm carries out a verification step to determine if the comparison results signify that the solution syntax tree and the response syntax tree comprise the same nodes and thus match (step 1216). If the syntax trees match, then the response is graded as correct (step 1218), and a score for the response is added to the participant's grade. If the syntax trees do not match, then the participant's response is graded as incorrect (step 1210), and no score for the response is added to the participant's grade. Alternatively, a partial score may be added to the participant's grade depending on the number of nodes in the response syntax tree that exist in the solution syntax tree.

Figure 13:
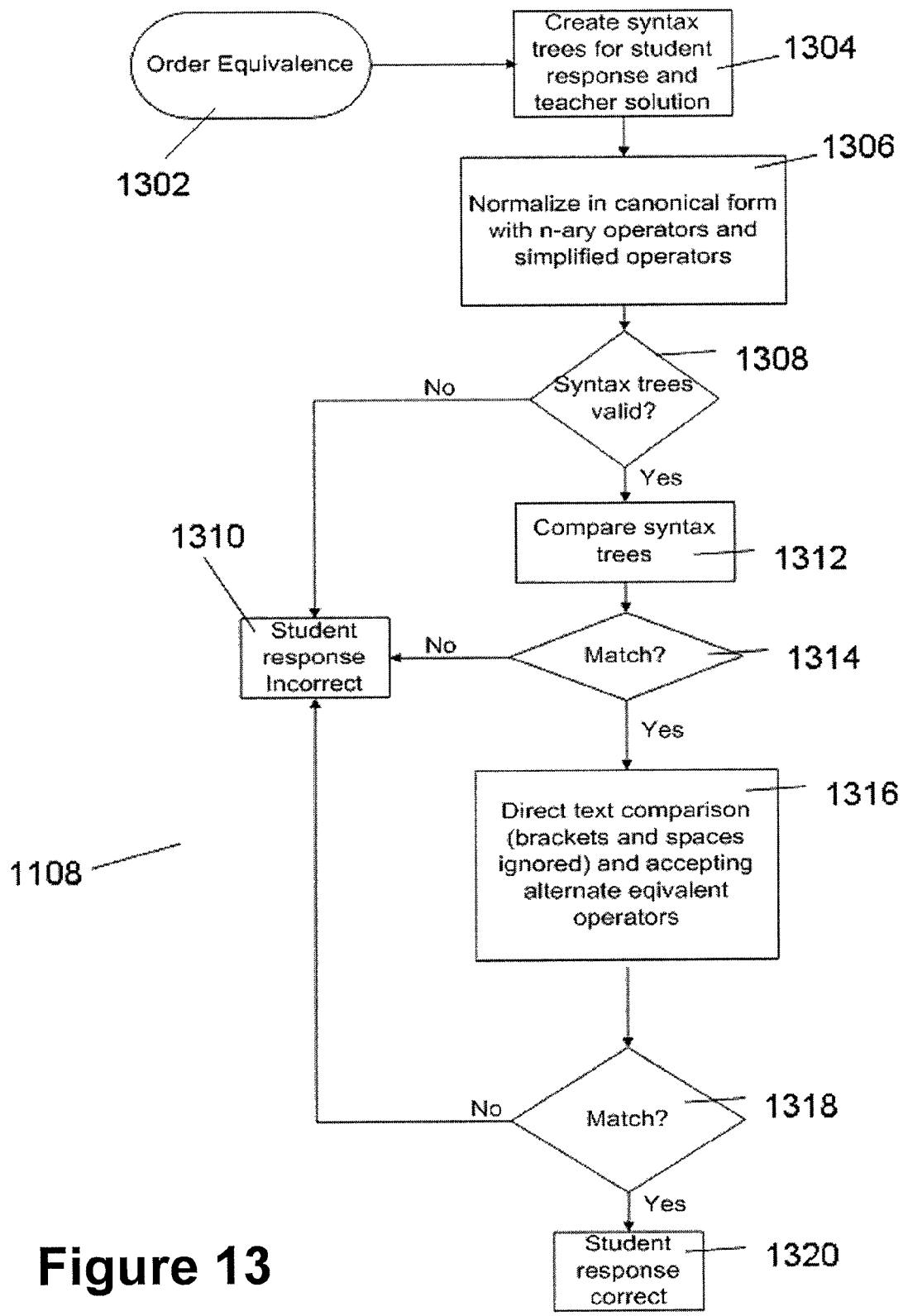
FIG. 13 is a flowchart showing steps of an Order Equivalence algorithm used by the participant response system of FIG. 1.

FIG. 13 is a flowchart showing steps performed during execution of the Order Equivalence grading algorithm generally indicated using reference numeral 1108. Order Equivalence algorithm 1108 begins by generating a logical syntax tree for both the LaTeX response expression and the solution expression (step 1304). The LaTeX response and solution expressions are each parsed into a tree-shaped hierarchy of operators and operands based generally on the order of operations, with the first operations to be performed occurring at the bottom of the syntax tree and the last operations to be performed occurring at the top of the syntax tree. The syntax trees are then normalized into a canonical form where common operators are simplified to a single n-ary operator as opposed to traditional binary operators (step 1306).

The normalized syntax trees are then evaluated to determine if they are mathematically valid (step 1308). If the response syntax tree is determined not to be mathematically valid, then the response is graded as incorrect (step 1310). If the syntax trees are mathematically valid, the response expression is then evaluated to determine whether or not it matches the equation of the question (step 1312). If the response expression matches the equation of the question, then the response is graded as incorrect (step 1310). In this embodiment, when a response is graded as incorrect, a score of zero is issued for that response.

Following step 1312, the solution syntax tree and the response syntax tree are compared in the same manner as described above with reference to the Formal Equivalence grading algorithm (step 1314). If the two syntax trees are confirmed to comprise the same terms and operators, the solution expression and the response expression are deemed to be at a minimum "formally equivalent", meaning that both the solution and the response syntax trees comprise the same nodes. A direct text comparison of the solution and response expressions is then carried out to determine the order of the generators (step 1316). In this step, brackets and spaces are not considered, while alternate representations of operators that perform the same function are considered. For example, "/" and "÷" would be considered as equivalent division operators, and "*" and "×" would be considered as equivalent multiplication operators. Following the direct text comparison, a verification is then carried out to determine if the solution and response expressions are the same (step 1318). If they are the same, then the response is graded as correct (step 1320), and a score for the response is added to the participant's grade. If the solution and response expressions are not the same, then the response is graded as incorrect and a score of zero is issued for that response (step 1310).

Figure 14:
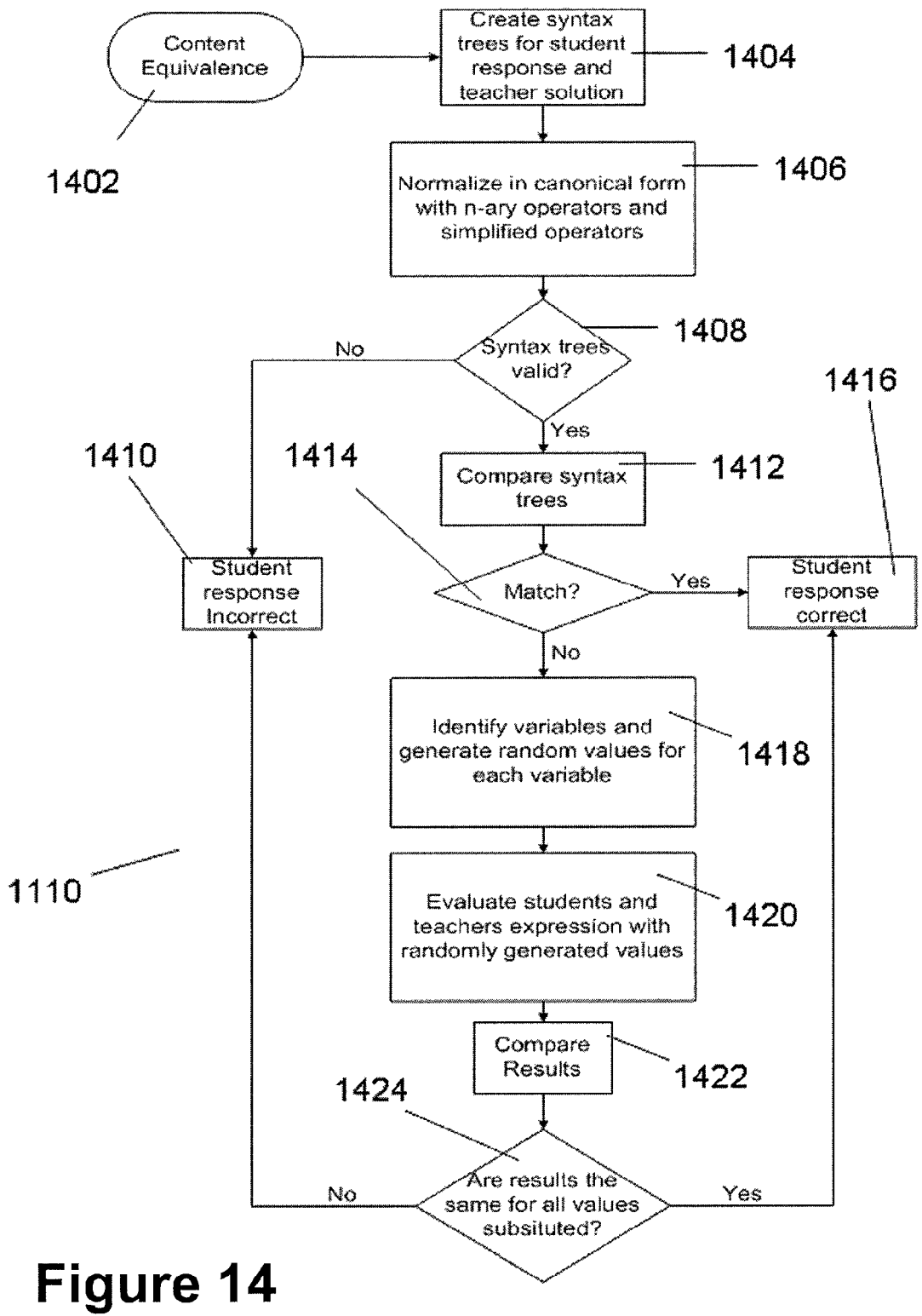
FIG. 14 is a flowchart showing steps of a Content Equivalence algorithm used by the participant response system of FIG. 1.

FIG. 14 is a flowchart showing steps performed during execution of the Content Equivalence grading algorithm generally indicated using reference numeral 1110. Content Equivalence algorithm 1110 begins by generating a logical syntax tree for both the LaTeX response expression and the solution expression (step 1404). The LaTeX response and solution expressions are each parsed into a tree-shaped hierarchy of operators and operands based generally on the order of operations, with the first operations to be performed occurring at the bottom of the synatx tree and the last operations to be performed occurring at the top of the syntax tree. The syntax trees are then normalized into a canonical form where common operators are simplified to a single n-ary operator as opposed to traditional binary operators (step 1406).

The normalized syntax trees are then evaluated to determine if they are mathematically valid (step 1408). If the response syntax tree is determined not to be mathematically valid, then the response is graded as incorrect (step 1410). If the syntax trees are mathematically valid, the response expression is then evaluated to determine whether or not it matches the equation of the question (step 1412). If the response expression matches the equation of the question, then the response is graded as correct (step 1416) and a score for the response is added to the participant's grade.

Following step 1412, if the response expression does not match the question, the solution syntax tree and the response syntax tree are compared in the same manner as described above with reference to the Formal Equivalence grading algorithm (step 1414). If the syntax trees match, then the response is graded as correct (step 1416), and a score for the response is added to the participant's grade. If the syntax trees do not match, then it is necessary to determine if the response expression and solution expression contain the same solution sets. In this embodiment, the response and solution expressions are solved using LabView mathematical algorithms provided by National Instruments of Austin, Tex., USA. Variables in the response and solution expressions are identified and a set of random values are generated for each variable (step 1418). Each variable is treated independently. The response expression and the solution expression are evaluated using the same random values for each variable (step 1420), and the results of the evaluation are compared (step 1422). If the results are within a suitable tolerance for all of the random variables substituted, then the response is graded as correct (step 1416), and the score for the response is added to the participant's grade. If the results are not within a suitable tolerance, then the response is graded as incorrect (step 1410), and a score of zero is issued for that response. If, during generation of the random variables, a random variable gives rise to exceptions such as dividing by zero, then that random variable is discarded and a new value for that variable is selected.

As will be appreciated, if the solution syntax tree is determined to be mathematically invalid a prompt may be displayed to notify the facilitator so that a replacement solution can be entered.

Figure 15A:
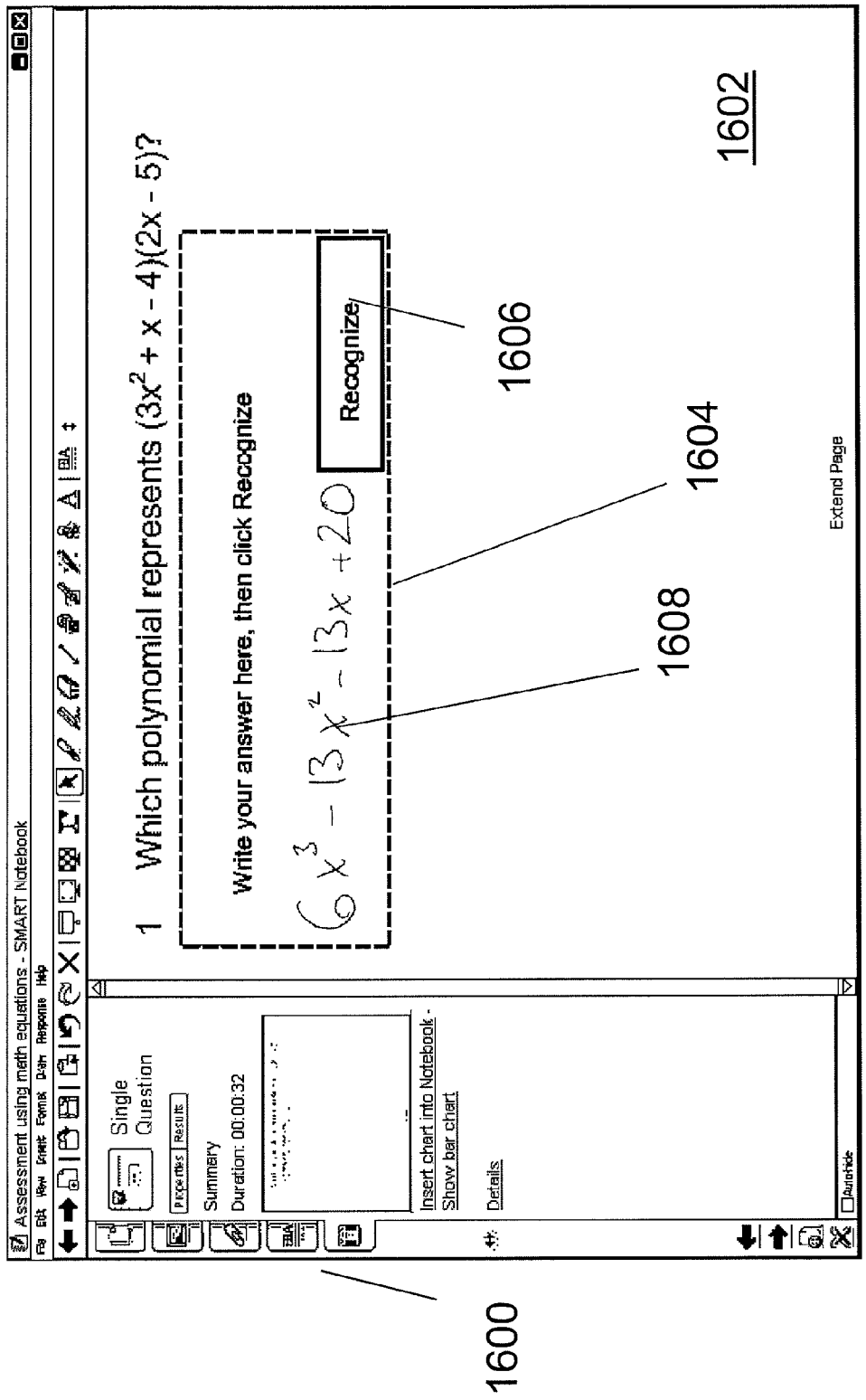
FIGS. 15A and 15B show alternative Participant Input and Participant Input Confirmation windows, respectively, presented by the participant response system of FIG. 1.
Figure 15B:
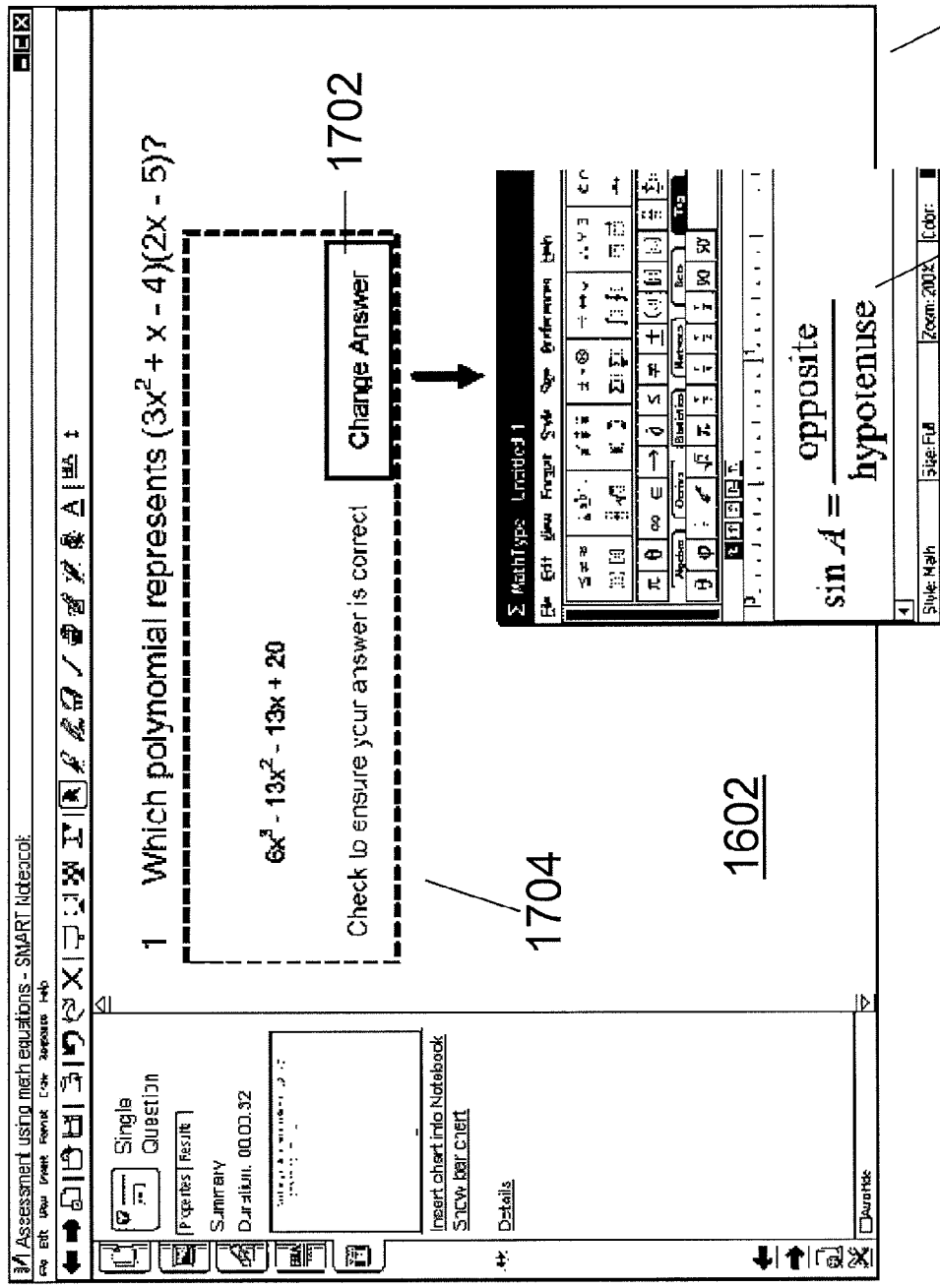

FIG. 15A shows another embodiment of a Participant Input window presented by the participant response system 50, and which is generally indicated by reference numeral 1600. Participant Input window 1600 is a SMART Notebook™ page presented by the SMART Response™ CE student software, and is intended for display on a response device that has handwriting input capability. Similar to Participant Input window 902 described above and with reference to FIG. 8, Participant Input window 1600 comprises a SMART Notebook™ page 1602 that displays a question to be answered by the participant. Participant Input window 1600 also comprises an annotation box 1604 that defines a field in which a response in the form of handwriting 1608 may be entered. Participant Input window 1600 further comprises a "recognize" button 1606, which may be selected once a handwritten response has been entered into the annotation box 1604. Selecting the "recognize" button 1606 causes the response device to execute a handwriting recognition algorithm, which analyzes the handwritten response and converts it into a text string. Selecting the "recognize" button 1606 also causes Participant Input Confirmation window 1700 to be displayed on the response device, as shown in FIG. 15B. Alternatively, the SMART Response™ CE Student software may wait a certain period of time and then automatically recognize the handwritten response, convert it into a text string, and display the Participant Input Confirmation window 1700.

Participant Input Confirmation window 1700 comprises a converted text display box 1704, in which the converted handwritten response is displayed for verification by the participant. As handwriting may not be accurately recognized, Participant Input Confirmation window 1700 provides a "change answer" button 1702, which may be selected if the participant is not satisfied with the converted handwritten response. Selecting the "change answer" button 1702 causes a response editor subwindow 1706 to be displayed, which comprises a set of character buttons 1708 that can be used to edit the converted response. Participant Input Confirmation window 1700 further comprises a "submit" button (not shown). Selecting the "submit" button executes the response input process described above and with reference to FIG. 9. In this embodiment, a participant may enter a handwritten response to be automatically graded into annotation box 1604. Additional annotation may be entered outside of the annotation box 1604, such as for example intermediate steps that are used to arrive at a final response. In this embodiment, the additional annotations are not automatically graded, but may be saved on a network drive or saved locally on the response device for later review by the facilitator. The final response is graded according to the methods described above and with reference to FIGS. 9 to 14. The facilitator may adjust the automated scoring based on the intermediate work.

Figure 16:
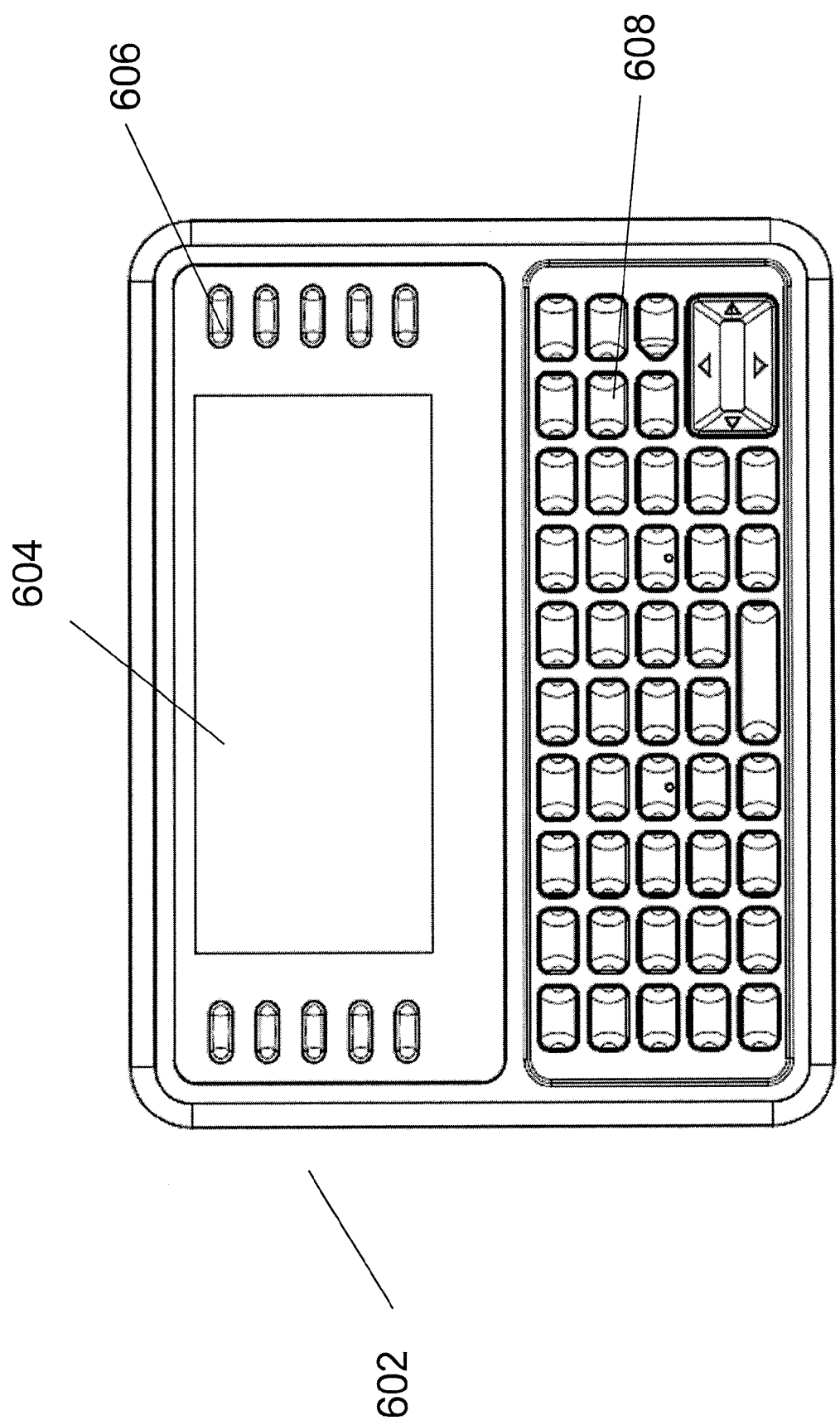
FIG. 16 is a plan view of an alternative response device for use with the participant response system of FIG. 1.

Although in the embodiments described above the assessment questions are displayed by each response device, in other embodiments, the questions may be displayed in alternative ways depending on the display capabilities of the response devices. For example, the question may instead be printed out and given to a participant or participants, or the question may be displayed on a common display, such as on IWB 54. For example, in embodiments described above, the response devices 62 run SMART Response™ CE Student software, and are generally capable of dealing with feature rich content. However, in other embodiments, response devices without such feature rich capabilities may alternatively be used. For example, FIG. 16 shows another embodiment of a response device for use with the participant response system 50, and is generally indicated using reference numeral 602. Response device 602 is a SMART Response™ XE device. Response device 602 comprises a simple LCD display 604, a set of soft key buttons 606 and a keypad 608 that may be used for entering text and commonly-used characters. Owing to the absence of feature rich display capabilities, equation-based questions are not displayed on the response device 602 and a participant using the response device 602 and taking an assessment relies on the IWB 54 for display of the questions. However, response device 602 is able to display a question number, and allows a response in the form of text to be entered.

As response device 602 is not capable of transmitting all LaTeX functions, owing to its general simplicity, the host computer 52 may be required to supplement any missing portions of the received response expression during the decoding. For example, a sine function would be transmitted by the response device 602 as "sin", which would be replaced by the LaTeX "\ sin" by the host computer 52 during decoding.

Although in the embodiments described above the participant response system is for use with response devices that are configured either with or without handwriting recognition capability, in other embodiments, the participant response system may be used with a variety of different response devices, some of which may have handwriting recognition capability and some of which may not. As will be understood, the use of such a variety of response devices is well suited for use with participant groups having participants with diverse capabilities or disabilities. In a related embodiment, the participant response system may be configured to detect the capabilities of each of the response devices, and present an appropriate participant response input mode accordingly, or alternatively the participant input system may allow the participant to choose a preferred participant response input mode.

Although in embodiments described above the participant response system uses LaTeX as a markup language, in other embodiments, other markup languages such as HTML, MathML, MatLab code, or other suitable proprietary languages may alternatively be used.

Although the solution syntax trees are described as being created concurrently with the response syntax trees, it will be appreciated that the solution syntax trees can be created before the response syntax trees such as for example when solutions are entered by the facilitator.

Although in embodiments described above the response devices communicate with the host computer via a wireless connection, in other embodiments, the response devices may alternatively communicate with the host computer via a wired connection. In related embodiments, one or more of the response devices may be located at remote sites and may communicate with the host computer via the Internet, or via another networking configuration such as a local area network (LAN) or wide area network (WAN).

In some embodiments, the host computer may also be connected to one or more servers wirelessly or via wired connections and may be connected to the IWB and/or transceiver via a wireless connection.

In some embodiments, the score for each participant may be automatically adjusted depending on the type of grading method is used for that question.

It will be readily understood by one of ordinary skill in the art that different communication and encoding protocols for communicating the responses to the xThink Engine than those described above may alternatively be used. Similarly, it will be readily understood by one of ordinary skill in the art that different parsing algorithms for generating syntax trees from those described above may alternatively be used.

Although in the embodiments described above the assessment is related to questions that generally comprise mathematical equations, in other embodiments, the questions may alternatively comprise equations relating to other fields such as, but not limited to, chemistry, physics, biology, calculus, and engineering.

Although in embodiments described above each node of the solution syntax tree and the response syntax tree are compared by selecting the same initial node of each syntax tree and completing a traversal of each syntax tree, a step that is akin to the process used for "depth-first" searching, in other embodiments, "breadth-first" searching may alternatively be used. As will be understood by one of ordinary skill in the art, the searching approach used is inconsequential provided all of the nodes of the two syntax trees are compared.

In embodiments described above, a submit button is used to initiate transmission of the encoded and compressed LaTeX response strings to the host computer 52. As will be appreciated, the submit button can be used when all of the questions of the assessment have been answered, and therefore when the last page of the assessment has been reached, or alternatively after each question or a subset of questions has answered. If desired, annotations from participants may be transmitted to the host computer for recognition and automatic grading. Also, the automatic grading could be performed on the response device.

Although relatively simple equations have been used as examples, more complex mathematics may be used, as would be understood by one of ordinary skill in the art.

Although embodiments have been described above with reference to the accompanying drawings, those of skill in the art will appreciate that other variations and modifications may be made without departing from the scope thereof as defined by the appended claims.

What is claimed is:

1. A computerized assessment grading method comprising:
   receiving, by a processing device, an encoded equation-based response to at least one assessment question, said at least one assessment question comprising an equation;
   decoding, by the processing device, said encoded equation-based response to yield a decoded equation-based response;
   determining, by the processing device, a grading method selected from a plurality of different grading methods;
   creating, by the processing device, (i) a syntax tree for the decoded equation-based response and (ii) a syntax tree for at least one solution to the at least one assessment question;
   determining, by the processing device, whether the decoded equation-based response matches the equation of said at least one assessment question;
   if the decoded equation-based response does not match the equation of said at least one assessment question, comparing, by the processing device, the syntax trees; and
   grading, by the processing device, the response according to the determined grading method based on the results of the comparison;
   wherein said grading comprises awarding a score based on the extent to which nodes of the syntax trees match.

2. The method of claim 1 wherein said grading method is selected from Order Equivalence, Formal Equivalence and Content Equivalence grading methods.

3. The method of claim 2 wherein said creating comprises parsing the decoded equation-based response and the at least one solution into tree-shaped hierarchies of operators and operands thereby to form the syntax trees.

4. The method of claim 3 wherein said creating further comprises normalizing the syntax trees.

5. The method of claim 4 wherein during said normalizing, the syntax trees are normalized into canonical form where common operators are simplified to a single n-ary operator.

6. The method of claim 3 wherein the tree-shaped hierarchies of operators and operands are generally based on orders of operation.

7. The method of claim 6 wherein operations to be performed first are placed at the bottom of the syntax trees and operations to be performed last are placed at the top of the syntax trees.

8. The method of claim 2 wherein said comparing comprises determining the similarity between nodes of the syntax trees.

9. The method of claim 2 wherein said comparing comprises determining if the syntax trees comprise the same nodes.

10. The method of claim 9 wherein when the syntax trees comprise the same nodes, said grading comprises grading the response as correct.

11. The method of claim 9 wherein said creating comprises parsing the decoded equation-based response and the at least one solution into tree-shaped hierarchies of operators and operands thereby to form the syntax trees.

12. The method of claim 11 wherein said creating further comprises normalizing the syntax trees.

13. The method of claim 12 wherein during said normalizing, the syntax trees are normalized into canonical form where common operators are simplified to a single n-ary operator.

14. The method of claim 11 wherein the tree-shaped hierarchies of operators and operands are generally based on orders of operation.

15. The method of claim 14 wherein operations to be performed first are placed at the bottom of the syntax trees and operations to be performed last are placed at the top of the syntax trees.

16. The method of claim 2 further comprising, prior to said comparing, determining if the syntax tree created for the decoded equation-based response is valid and when said syntax tree created for the decoded equation-based response is not valid, bypassing said comparing and grading said response as incorrect.

17. The method of claim 2 wherein said receiving comprises receiving the encoded equation-based response from a plurality of response devices.

18. The method of claim 2 wherein said decoding, by the processing device, comprises decoding the encoded equation-based response into a type-setting language.

19. The method of claim 18 wherein said type-setting language is LaTex.

20. A computerized assessment grading method comprising:
   upon receipt of an encoded equation-based response to an assessment question, said assessment question comprising an equation, decoding, by a processing device, the encoded equation-based response and processing the decoded equation-based response to determine a hierarchy of operators and operands and a grading method selected from a plurality of different grading methods;
   determining, by the processing device, if the response comprises an equation that matches the equation of the assessment question;
   if the response does not comprises an equation that matches the equation of the assessment question, comparing, by the processing device, (i) the response hierarchy of operators and operands with (ii) a solution hierarchy of operators and operands; and
   grading, by the processing device, the response according to the determined grading method based on the comparison;
   wherein said grading comprises awarding a score based on the extent to which nodes of the syntax trees match.

21. The method of claim 20 wherein said grading method is selected from Order Equivalence, Formal Equivalence and Content Equivalence grading methods.

22. The method of claim 21 wherein said decoding, by the processing device, comprises decoding the encoded equation-based response into a type-setting language.

23. The method of claim 22 wherein the response and solution hierarchies of operators and operands are generally based on orders of operation.

24. The method of claim 22 wherein said comparing comprises determining if the hierarchies of operators and operands match.

25. The method of claim 22 further comprising, prior to said comparing, determining if the hierarchy of operators and operands determined from processing the decoded equation-based response is valid and when said hierarchy of operators and operands determined from processing the decoded equation-based response is not valid, bypassing said comparing and grading said response as incorrect.

26. The method of claim 22 further comprising, prior to said creating, receiving the encoded equation-based response from one or more response devices.

27. The method of claim 22 wherein said type-setting language is LaTex.

28. A participant response system comprising:
at least one response device, each response device having an input interface permitting a user to input an equation-based response to a question, said question comprising an equation; and
processing structure communicating with each response device, said processing structure, in response to an encoded equation-based response received from a response device, decoding the encoded equation-based response to yield a decoded equation-based response, determining from the decoded equation-based response a grading method selected from a plurality of different grading methods and executing the determined grading method that causes said processing structure to create a syntax tree for the decoded equation-based response, determine whether the decoded equation-based response matches the equation of the question, if the decoded equation-based response does not match the equation of the question compare (i) the syntax tree created for the decoded equation-based response with (ii) a solution syntax tree, and grade the response according to the grading method based on the results of the comparison;
wherein said grading comprises awarding a score based on the extent to which nodes of the syntax trees match.

29. A participant response system comprising:
at least one response device, each response device having an input interface permitting a user to input an equation-based response to a question, said question comprising an equation; and
processing structure communicating with each response device, said processing structure, in response to a received encoded equation-based response, carrying out the method according to claim 20.

30. An apparatus comprising:
a processing device; and
memory storing computer program code, the processing device communicating with the memory and executing the computer program code causing the apparatus at least to, in response to a received encoded equation-based response to an assessment question, wherein said assessment question comprises an equation: decode, by the processing device, said encoded equation-based response to yield a decoded equation-based response; determine, by the processing device, a grading method selected from a plurality of different grading methods; create a syntax tree for the decoded equation-based response; determine whether the decoded equation-based response matches the equation of the assessment question; if the decoded equation-based response does not match the equation of the assessment question compare (i) the syntax tree created for the decoded equation-based response with (ii) a solution syntax tree; and grade the response according to the grading method based on the results of the comparison;
wherein said grading comprises awarding a score based on the extent to which nodes of the syntax trees match.

31. The apparatus of claim 30 wherein said grading method is selected from Order Equivalence, Formal Equivalence and Content Equivalence grading methods.

32. The apparatus of claim 31 wherein said processing device is caused to decode the encoded equation-based response into a type-setting language.

33. The apparatus of claim 32 wherein said type-setting language is LaTex.

34. A non-transitory computer readable medium embodying computer program code, which when executed causes a processing device to, in response to a received equation-based response to an assessment question, said assessment question comprising an equation: decode, by the processing device, said encoded equation-based response to yield a decoded equation-based response; determine, by the processing device, a grading method selected from a plurality of different grading methods; create a syntax tree for the decoded equation-based response; determine whether the decoded equation-based response matches the equation of the assessment question; if the decoded equation-based response does not match the equation of the assessment question, compare (i) the syntax tree created for the decoded equation-based response with (ii) a solution syntax tree; and grade the response according to the grading method based on the results of the comparison;
wherein said grading comprises awarding a score based on the extent to which nodes of the syntax trees match.

* * * * *